(12) United States Patent
Zimmerman et al.

(10) Patent No.: US 11,604,002 B2
(45) Date of Patent: Mar. 14, 2023

(54) THERMOSTAT WITH STEADY STATE TEMPERATURE ESTIMATION

(71) Applicant: Johnson Controls Technology Company, Auburn Hills, MI (US)

(72) Inventors: Nathan M. Zimmerman, Wauwatosa, WI (US); Michael J. Ajax, Milwaukee, WI (US); Nicholas S. Van Derven, Wauwatosa, WI (US); John M. House, Saint-Leonard (CA); Timothy I. Salsbury, Mequon, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 1086 days.

(21) Appl. No.: 16/139,882

(22) Filed: Sep. 24, 2018

(65) Prior Publication Data
US 2019/0178511 A1 Jun. 13, 2019

Related U.S. Application Data

(60) Provisional application No. 62/597,286, filed on Dec. 11, 2017.

(51) Int. Cl.
*F24F 11/70* (2018.01)
*G05D 23/19* (2006.01)
(Continued)

(52) U.S. Cl.
CPC .............. *F24F 11/30* (2018.01); *F24F 11/62* (2018.01); *F24F 11/70* (2018.01); *F24F 11/89* (2018.01);
(Continued)

(58) Field of Classification Search
CPC .. F24F 11/30; F24F 11/62; F24F 11/70; F24F 11/89
See application file for complete search history.

(56) References Cited

U.S. PATENT DOCUMENTS

2013/0018513 A1* 1/2013 Metselaar ............... F24F 11/30
700/278
2015/0285526 A1* 10/2015 Smith ...................... F24F 11/62
700/276
(Continued)

OTHER PUBLICATIONS

International Search Report and Written Opinion on PCT/US2018/064297, dated Feb. 18, 2019, 14 pages.
(Continued)

*Primary Examiner* — Manuel A Rivera Vargas
(74) *Attorney, Agent, or Firm* — Foley & Lardner LLP

(57) ABSTRACT

A thermostat is disclosed. The thermostat can include one or more temperature sensors configured to measure one or more temperature values. The thermostat can include a processing circuit. The processing circuit can receive the one or more temperature values from the one or more temperature sensors. The processing circuit can receive one or more central processing unit (CPU) usage values, wherein the one or more CPU usage values indicate computing usage of the processing circuit. The processing circuit can determine, based on an empirical model comprising one or more gain values and one or more filters and based on one or more signals, a temperature of the building. The one or more signals comprise the one or more temperature values and the one or more CPU usage values. The empirical model accounts for dynamics of heat generated by the processing circuit and airflow acting on the thermostat.

20 Claims, 15 Drawing Sheets

(51) Int. Cl.
  *F24F 110/12* (2018.01)
  *F24F 11/30* (2018.01)
  *F24F 11/62* (2018.01)
  *F24F 11/89* (2018.01)
  *F24F 120/20* (2018.01)

(52) U.S. Cl.
  CPC ...... *G05D 23/1931* (2013.01); *F24F 2110/12* (2018.01); *F24F 2120/20* (2018.01)

(56) References Cited

U.S. PATENT DOCUMENTS

2016/0327300 A1 11/2016 Ribbich et al.
2018/0322766 A1* 11/2018 Pierson ................ G08B 21/187

OTHER PUBLICATIONS

PCT International Search Report and Written Opinion dated Feb. 18, 2019 in International Application No. PCT/US2018/064297, 14 pages.

* cited by examiner

THERMOSTAT WITH STEADY STATE TEMPERATURE ESTIMATION

CROSS-REFERENCE TO RELATED APPLICATION

This application claims the benefit of the following provisionally filed U.S. patent application: Application No. 62/597,286, filed Dec. 11, 2017, and entitled "Thermostat with Steady State Temperature Estimation," which application is hereby incorporated herein by reference.

BACKGROUND

A thermostat, in general, is a component of an HVAC control system. Thermostats sense the temperature or other parameters (e.g., humidity) of a system and control components of the HVAC system in order to maintain a set point for the temperature or other parameter. A thermostat may be designed to control a heating or cooling system or an air conditioner. Thermostats use a variety of sensors to measure temperature and other desired parameters of a system. An HVAC system is a system that includes equipment for heating, cooling, and/or ventilating an environment.

SUMMARY

One embodiment of the present disclosure includes a thermostat for controlling building equipment of a building. The thermostat can include one or more temperature sensors configured to measure one or more temperature values. The thermostat can include a processing circuit coupled to the one or more temperature sensors. The processing circuit can receive the one or more temperature values from the one or more temperature sensors. The processing circuit can receive one or more central processing unit (CPU) usage values, wherein the one or more CPU usage values indicate computing usage of the processing circuit. The processing circuit can determine, based on an empirical model comprising one or more gain values and one or more filters and based on one or more signals, a temperature of the building. The one or more signals comprise the one or more temperature values and the one or more CPU usage values. The empirical model accounts for dynamics of heat generated by the processing circuit and airflow acting on the thermostat.

Another embodiment of the present disclosure includes a method for controlling building equipment of a building. The method can include receiving one or more temperature values measured by one or more temperature sensors. The method can include receiving one or more central processing unit (CPU) usage values, the one or more CPU usage values indicating computing usage of a processing circuit of a thermostat. The method can include determining, based on an empirical model comprising one or more gain values and one or more filters and based on one or more signals, a temperature of the building. The one or more signals comprise the one or more temperature values and the one or more CPU usage values. The empirical model accounts for dynamics of heat generated by the processing circuit and airflow acting on the thermostat.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, a thermostat is described herein that can perform heat rise compensation and airflow compensation, according to various exemplary embodiments. The thermostat is configured to perform various techniques to estimate temperature when the thermostat is first turning on and perform other techniques to estimate temperature when the thermostat is operating at a steady state. Thermostats can be adversely affected by varying amounts of airflow and heat generated by heat generating components of the thermostat. For example, a homeowner may install their thermostat in a variety of different environments which may range from no airflow to an extreme amount of airflow. In some cases, the amount of airflow is dynamic and can vary. Furthermore, various components, such as a processor, may dissipate varying amounts of heat based on a current processor utilization.

Figure 6:
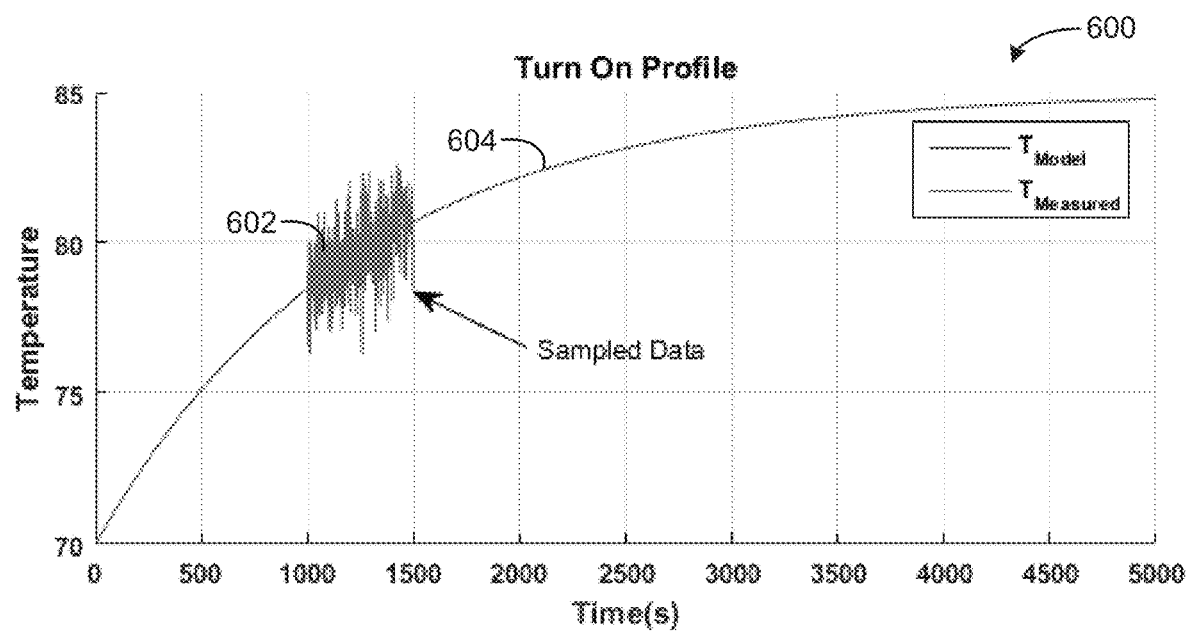
FIG. 6 is a chart illustrating a temperature model and collected data that can be used by the startup temperature compensator of the thermostat of FIG. 3 to estimate an ambient temperature with a non-linear least squares (NLSQ) technique when the thermostat of FIG. 3 starts, according to an exemplary embodiment.

The issue of airflow in the thermostat can become worse if the thermostat has a high degree of internal heating that is affecting the temperature readings (e.g., temperature error of ±10° F. or more). In some cases, a thermostat can have a temperature error of approximately 10° F. The temperature sensing error, on the order of 1-10° F., caused by variations in airflow can be compensated for via multiple temperature sensors. FIG. 6 illustrates a thermostat with and without airflow acting on the thermostat. In some embodiments, a thermostat may not need to compensate for airflow where a mechanical solution can be implemented to reduce the effect of airflow, for this reason thermostats do not need to compensate for airflow. However, if a mechanical solution is not available, airflow can be compensated through the various modeling techniques described herein.

In some cases, a thermostat, e.g., the thermostat described herein, can generate heat. This may require the thermostat to perform temperature compensation on temperatures measured within the thermostat based on the generated heat. When an electronic device (e.g., a thermostat) is booted, its present state may be unknown. The device may be below, at, or above room temperature. Consequently, without estimation, the temperature of the thermostat can render the thermostat unreliable for the thermostat's first hour or more of operation more of operation until a steady state is achieved, depending on the particular thermostat.

The thermostat described herein is configured to estimate the starting state of the thermostat such that it quickly reports an accurate temperature regardless of the initial state of the thermostat. Consequently, if the thermostat is rebooted, the thermostat does not report a significantly incorrect temperature for the first hour of operation, it quickly reports an accurate temperature regardless of the initial state of the thermostat. Likewise if the thermostat is started from room temperature, the thermostat can apply an offset gradually as the thermostat heats up.

The thermostat described herein can use state estimation with a Kalman filter and/or Nonlinear Least Squares to compensate for unknown starting temperature of the thermostat and can compensate for the thermostat heating up. The thermostat can use a differential equation based thermal model and the Algebraic Riccati equation to optimally determine a state of the thermostat. As discussed herein, the thermostat is configured to estimate the present temperature state of the thermostat based on stochastic state estimation and a thermal model. The thermostat is configured to perform the estimation using a Kalman filter which allows the electronics to estimate its current state regardless of the boot state or present time. Consequently, these methods are recursive and time invariant, according to some embodiments.

Figure 1A:
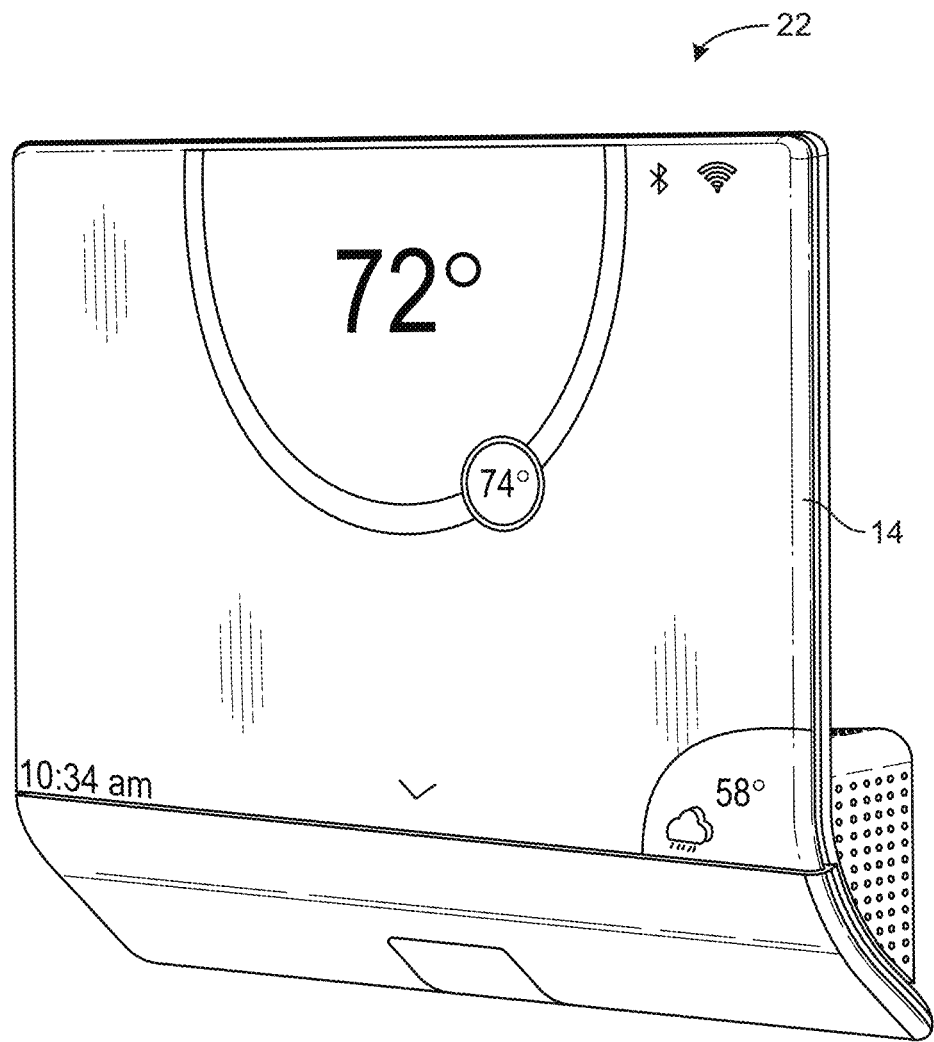
FIG. 1A is a drawing of a thermostat with a transparent cantilevered display, according to an exemplary embodiment.

Referring now to FIG. 1A, a drawing of a thermostat 22 that includes a transparent cantilevered user interface 14 is shown, according to an exemplary embodiment. The user interface 14 may be an interactive display that can display information to a user and receive input from the user. The user interface 14 may be transparent such that a user can view information on the display and view the surface (e.g., a wall) located behind the display. The thermostat 22 is configured to measure an ambient room temperature and display the ambient room temperature to a user. Furthermore, via the user interface 14, a user may input a temperature setpoint. Based on the temperature setpoint and the current ambient temperature, the thermostat 22 is configured to cause building equipment to either heat or cool the building. Thermostats with transparent and cantilevered user interfaces are described in further detail in U.S. patent application Ser. No. 15/146,649 filed May 4, 2016, the entirety of which is incorporated by reference herein.

The user interface 14 can be a touchscreen or other type of electronic display configured to present information to a user in a visual format (e.g., as text, graphics, etc.) and receive input from a user (e.g., via a touch-sensitive panel). For example, the user interface 14 may include a touch-sensitive panel layered on top of an electronic visual display. A user can provide inputs through simple or multi-touch gestures by touching the user interface 14 with one or more fingers and/or with a stylus or pen. The user interface 14 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of user interface 14 allowing registration of touch in two or even more locations at once. The display may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoS), or any other display technologies known in the art. In some embodiments, the user interface 14 is configured to present visual media (e.g., text, graphics, etc.) without requiring a backlight.

Figure 1B:
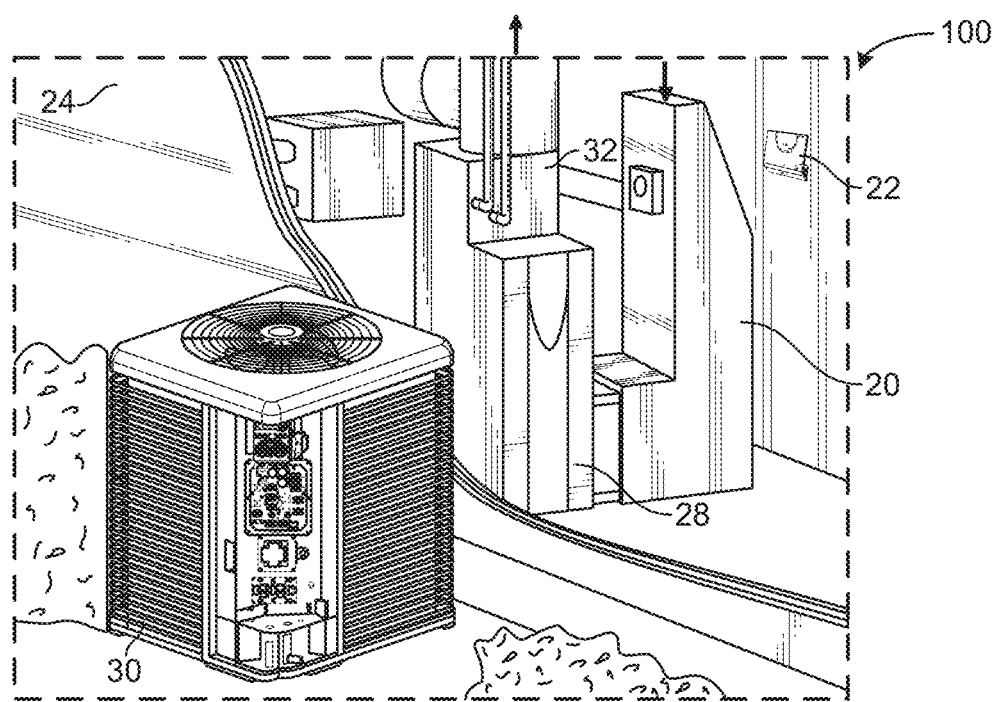
FIG. 1B is a schematic drawing of a building equipped with a residential heating and cooling system and a thermostat, according to an exemplary embodiment.

FIG. 1B illustrates a residential heating and cooling system 100 that can be controlled by a thermostat 22, according to an exemplary embodiment. The residential heating and cooling system 100 may provide heated and cooled air to a residential structure. Although described as a residential heating and cooling system 100, embodiments of the systems and methods described herein can be utilized in a cooling unit or a heating unit in a variety of applications include commercial HVAC units (e.g., roof top units). In general, a residence 24 includes refrigerant conduits that operatively couple an indoor unit 28 to an outdoor unit 30. Indoor unit 28 may be positioned in a utility space, an attic, a basement, and so forth. Outdoor unit 30 is situated adjacent to a side of residence 24. Refrigerant conduits transfer refrigerant between indoor unit 28 and outdoor unit 30, typically transferring primarily liquid refrigerant in one direction and primarily vaporized refrigerant in an opposite direction.

When the system 100 shown in FIG. 1B is operating as an air conditioner, a coil in outdoor unit 30 serves as a condenser for recondensing vaporized refrigerant flowing from indoor unit 28 to outdoor unit 30 via one of the refrigerant conduits. In these applications, a coil of the indoor unit 28, designated by the reference numeral 32, serves as an evaporator coil. Evaporator coil 32 receives liquid refrigerant (which may be expanded by an expansion device, not shown) and evaporates the refrigerant before returning it to outdoor unit 30.

Outdoor unit 30 draws in environmental air through its sides, forces the air through the outer unit coil using a fan, and expels the air. When operating as an air conditioner, the air is heated by the condenser coil within the outdoor unit 30 and exits the top of the unit at a temperature higher than it entered the sides. Air is blown over indoor coil 32 and is then circulated through residence 24 by means of ductwork 20, as indicated by the arrows entering and exiting ductwork 20. The overall system 100 operates to maintain a desired temperature as set by thermostat 22. When the temperature sensed inside the residence 24 is higher than the set point on the thermostat 22 (with the addition of a relatively small tolerance), the air conditioner will become operative to refrigerate additional air for circulation through the residence 24. When the temperature reaches the set point (with the removal of a relatively small tolerance), the unit can stop the refrigeration cycle temporarily.

In some embodiments, the system 100 configured so that the outdoor unit 30 is controlled to achieve a more elegant control over temperature and humidity within the residence 24. The outdoor unit 30 is controlled to operate components within the outdoor unit 30, and the system 100, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Figure 2:
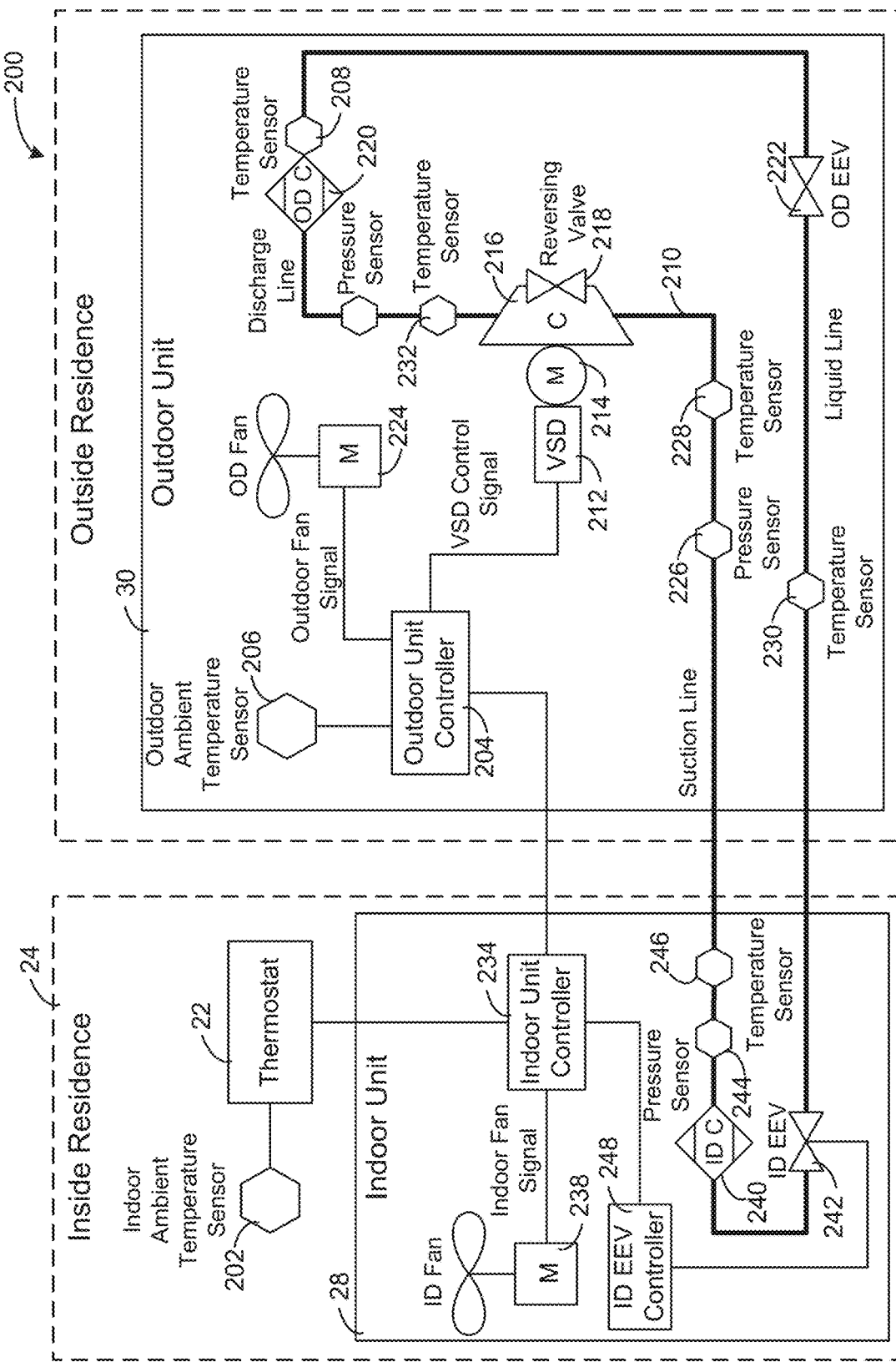
FIG. 2 is a schematic drawing of the thermostat of FIG. 1A and the residential heating and cooling system of FIG. 1B, according to an exemplary embodiment.

Referring now to FIG. 2, an HVAC system 200 is shown according to an exemplary embodiment. Various components of system 200 are located inside residence 24 while other components are located outside residence 24. Outdoor unit 30, as described with reference to FIG. 1, is shown to be located outside residence 24 while indoor unit 28 and thermostat 22, as described with reference to FIG. 1, are shown to be located inside the residence 24. In various embodiments, the thermostat 22 can cause the indoor unit 28 and the outdoor unit 30 to heat residence 24. In some embodiments, the thermostat 22 can cause the indoor unit 28 and the outdoor unit 30 to cool the residence 24. In other embodiments, the thermostat 22 can command an airflow change within the residence 24 to adjust the humidity within the residence 24.

Thermostat 22 is configured to generate control signals for indoor unit 28 and/or outdoor unit 30. The thermostat 22 is shown to be connected to an indoor ambient temperature sensor 202, and an outdoor unit controller 204 is shown to be connected to an outdoor ambient temperature sensor 206. The indoor ambient temperature sensor 202 and the outdoor ambient temperature sensor 206 may be any kind of temperature sensor (e.g., thermistor, thermocouple, etc.). The thermostat 22 may measure the temperature of residence 24 via the indoor ambient temperature sensor 202. Further, the thermostat 22 is configured to receive the temperature outside residence 24 via communication with the outdoor unit controller 204. In various embodiments, the thermostat 22 generates control signals for the indoor unit 28 and the outdoor unit 30 based on the indoor ambient temperature (e.g., measured via indoor ambient temperature sensor 202), the outdoor temperature (e.g., measured via the outdoor ambient temperature sensor 206), and/or a temperature set point. The thermostat 22 may include one or more PCBs, an enclosure, a touch screen, buttons, and/or any other thermostat component.

The indoor unit 28 and the outdoor unit 30 may be electrically connected. Further, indoor unit 28 and outdoor unit 30 may be coupled via conduits 210. The outdoor unit 30 is configured to compress refrigerant inside conduits 210 to either heat or cool the building based on the operating mode of the indoor unit 28 and the outdoor unit 30 (e.g., heat pump operation or air conditioning operation). The refrigerant inside conduits 210 may be any fluid that absorbs and extracts heat. For example, the refrigerant may be hydro fluorocarbon (HFC) based R-410A, R-407C, and/or R-134a.

The outdoor unit 30 is shown to include the outdoor unit controller 204, a variable speed drive 212, a motor 214 and a compressor 216. The outdoor unit 30 is configured to control the compressor 216 and to further cause the compressor 216 to compress the refrigerant inside conduits 210. In this regard, the compressor 216 may be driven by the variable speed drive 212 and the motor 214. For example, the outdoor unit controller 204 can generate control signals for the variable speed drive 212. The variable speed drive 212 (e.g., an inverter, a variable frequency drive, etc.) may be an AC-AC inverter, a DC-AC inverter, and/or any other type of inverter. The variable speed drive 212 is configured to vary the torque and/or speed of the motor 214 which in turn drives the speed and/or torque of compressor 216. The compressor 216 may be any suitable compressor such as a screw compressor, a reciprocating compressor, a rotary compressor, a swing link compressor, a scroll compressor, or a turbine compressor, etc.

In some embodiments, the outdoor unit controller 204 is configured to process data received from the thermostat 22 to determine operating values for components of the system 100, such as the compressor 216. In one embodiment, the outdoor unit controller 204 is configured to provide the determined operating values for the compressor 216 to the variable speed drive 212, which controls a speed of the compressor 216. The outdoor unit controller 204 is controlled to operate components within the outdoor unit 30, and the indoor unit 28, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

In some embodiments, the outdoor unit controller 204 can control a reversing valve 218 to operate system 200 as a heat pump or an air conditioner. For example, the outdoor unit controller 204 may cause reversing valve 218 to direct compressed refrigerant to the indoor coil 32 while in heat pump mode and to an outdoor coil 220 while in air conditioner mode. In this regard, the indoor coil 32 and the outdoor coil 220 can both act as condensers and evaporators depending on the operating mode (i.e., heat pump or air conditioner) of system 200.

Further, in various embodiments, outdoor unit controller 204 is configured to control and/or receive data from an outdoor electronic expansion valve (EEV) 222. The outdoor electronic expansion valve 222 may be an expansion valve controlled by a stepper motor. In this regard, the outdoor unit controller 204 is configured to generate a step signal (e.g., a PWM signal) for the outdoor electronic expansion valve 222. Based on the step signal, the outdoor electronic expansion valve 222 can be held fully open, fully closed, partial open, etc. In various embodiments, the outdoor unit controller 204 is configured to generate step signal for the outdoor electronic expansion valve 222 based on a subcool and/or superheat value calculated from various temperatures and pressures measured in system 200. In one embodiment, the outdoor unit controller 204 is configured to control the position of the outdoor electronic expansion valve 222 based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit controller 204 is configured to control and/or power outdoor fan 224. The outdoor fan 224 is configured to blow air over the outdoor coil 220. In this regard, the outdoor unit controller 204 can control the amount of air blowing over the outdoor coil 220 by generating control signals to control the speed and/or torque of outdoor fan 224. In some embodiments, the control signals are pulse wave modulated signals (PWM), analog voltage signals (i.e., varying the amplitude of a DC or AC signal), and/or any other type of signal. In one embodiment, the outdoor unit controller 204 can control an operating value of the outdoor fan 224, such as speed, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit 30 may include one or more temperature sensors and one or more pressure sensors. The temperature sensors and pressure sensors may be electrical connected (i.e., via wires, via wireless communication, etc.) to the outdoor unit controller 204. In this regard, the outdoor unit controller 204 is configured to measure and store the temperatures and pressures of the refrigerant at various locations of the conduits 210. The pressure sensors may be any kind of transducer that is configured to sense the pressure of the refrigerant in the conduits 210. The outdoor unit 30 is shown to include pressure sensor 226. The pressure sensor 226 may measure the pressure of the refrigerant in conduit 210 in the suction line (i.e., a predefined distance from the inlet of compressor 216. Further, the outdoor unit 30 is shown to include pressure sensor 226. The pressure sensor 226 may be configured to measure the pressure of the refrigerant in conduits 210 on the discharge line (e.g., a predefined distance from the outlet of compressor 216).

The temperature sensors of outdoor unit 30 may include thermistors, thermocouples, and/or any other temperature sensing device. The outdoor unit 30 is shown to include temperature sensor 208, temperature sensor 228, temperature sensor 230, and temperature sensor 232. The temperature sensors (i.e., temperature sensor 208, temperature sensor 228, temperature sensor 230, and/or temperature sensor 232) are configured to measure the temperature of the refrigerant at various locations inside conduits 210.

In FIG. 2, the indoor unit 28, the indoor unit 28 is shown to include indoor unit controller 234, indoor electronic expansion valve controller 236, an indoor fan 238, an indoor coil 240, an indoor electronic expansion valve 242, a pressure sensor 244, and a temperature sensor 246. The indoor unit controller 234 is configured to generate control signals for indoor electronic expansion valve controller 248. The signals may be set points (e.g., temperature set point, pressure set point, superheat set point, subcool set point, step value set point, etc.). In this regard, indoor electronic expansion valve controller 248 is configured to generate control signals for indoor electronic expansion valve 242. In various embodiments, indoor electronic expansion valve 242 may be the same type of valve as outdoor electronic expansion valve 222. In this regard, indoor electronic expansion valve controller 248 is configured to generate a step control signal (e.g., a PWM wave) for controlling the stepper motor of the indoor electronic expansion valve 242. In this regard, indoor electronic expansion valve controller 248 is configured to fully open, fully close, or partially close the indoor electronic expansion valve 242 based on the step signal.

Indoor unit controller 234 is configured to control indoor fan 238. The indoor fan 238 is configured to blow air over indoor coil 32. In this regard, the indoor unit controller 234 can control the amount of air blowing over the indoor coil 240 by generating control signals to control the speed and/or torque of the indoor fan 238. In some embodiments, the control signals are pulse wave modulated signals (PWM), analog voltage signals (i.e., varying the amplitude of a DC or AC signal), and/or any other type of signal. In one embodiment, the indoor unit controller 234 may receive a signal from the outdoor unit controller indicating one or more operating values, such as speed for the indoor fan 238. In one embodiment, the operating value associated with the indoor fan 238 is an airflow, such as cubic feet per minute (CFM). In one embodiment, the outdoor unit controller 204 may determine the operating value of the indoor fan based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The indoor unit controller 234 may be electrically connected (e.g., wired connection, wireless connection, etc.) to pressure sensor 244 and/or temperature sensor 246. In this regard, the indoor unit controller 234 can take pressure and/or temperature sensing measurements via pressure sensor 244 and/or temperature sensor 246. In one embodiment, pressure sensor 244 and temperature sensor 246 are located on the suction line (i.e., a predefined distance from indoor coil 32). In other embodiments, the pressure sensor 244 and/or the temperature sensor 246 may be located on the liquid line (i.e., a predefined distance from indoor coil 32).

Figure 3:
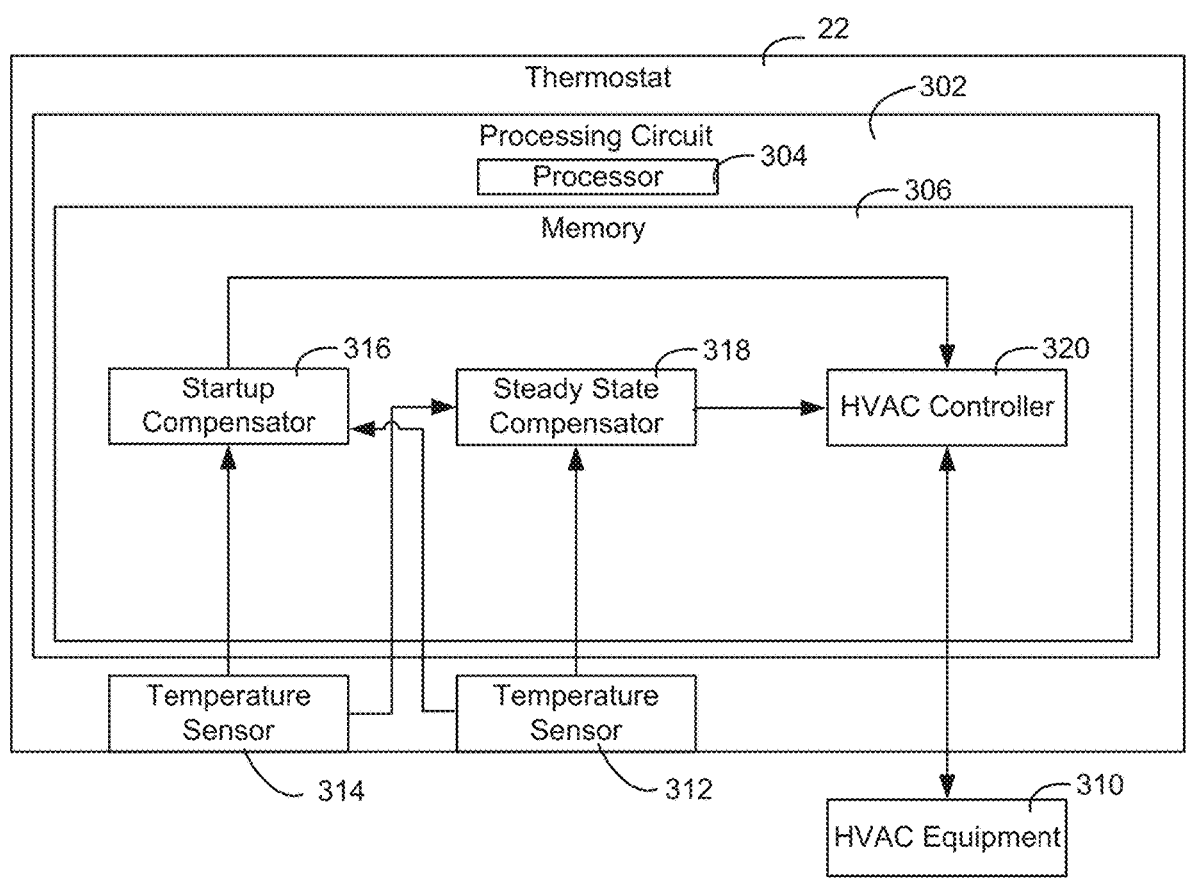
FIG. 3 is a block diagram of the thermostat of FIGS. 1A and 1B shown to include a startup temperature compensator and a steady state temperature compensator, according to an exemplary embodiment.

Referring now to FIG. 3, the thermostat of FIGS. 1 and 2 is shown in greater detail, according to an exemplary embodiment. The thermostat 22 is shown to include a processing circuit 302, a temperature sensor 312, and a temperature sensor 314.

The processing circuit 302 is shown to include a processor 304 and a memory 306. The processor 304 can be a general purpose or specific purpose processor, an application specific integrated circuit (ASIC), one or more field programmable gate arrays (FPGAs), a group of processing components, or other suitable processing components. The processor 304 may be configured to execute computer code and/or instructions stored in the memory 306 or received from other computer readable media (e.g., CDROM, network storage, a remote server, etc.).

The memory 306 can include one or more devices (e.g., memory units, memory devices, storage devices, etc.) for storing data and/or computer code for completing and/or facilitating the various processes described in the present disclosure. The memory 306 can include random access memory (RAM), read-only memory (ROM), hard drive storage, temporary storage, non-volatile memory, flash memory, optical memory, or any other suitable memory for storing software objects and/or computer instructions. The memory 306 can include database components, object code components, script components, or any other type of information structure for supporting the various activities and information structures described in the present disclosure. The memory 306 can be communicably connected to the processor 304 via the processing circuit 302 and can include computer code for executing (e.g., by the processor 304) one or more processes described herein.

The thermostat 22 is shown to include temperature sensor 312 and temperature sensor 314. The thermostat 22 can measure ambient temperature within the thermostat 22 via the temperature sensor 312 and the temperature sensor 314. The temperature sensors 312 and 314 is configured to measure the ambient temperature of a building (e.g. the residence 24), the temperature of a zone associated with the building, and/or the internal temperature of thermostat 22. Temperature sensors 312 and 314 may be sensors outputting an analog signal (e.g., sinusoid, square wave, PWM wave, etc.) and/or a measureable value (e.g. current, voltage, resistance) and/or may be a temperature module outputting a digital value. The temperature sensors 312 and 314 may communicate a digital and/or analog value to the thermostat 22. The temperature sensors 312 and/or 314 may be located inside an enclosure of the thermostat 22. The temperature sensors 312 and 314 may be any other type or combination of temperature sensor.

The memory 306 is shown to include a steady state compensator 318 and a startup compensator 316. The steady state compensator 318 can be configured to determine ambient temperature based on temperature measurements made by one or more temperature sensors when the thermostat 22 is booted and is in a steady state (e.g., a predefined amount of time after being turned on). The startup compensator 316 is configured to determine ambient temperature when the thermostat is turned on (e.g., for a predefined amount of time after the thermostat 22 is turned on). In this regard, the startup compensator 316 is configured to estimate temperature while the thermostat 22 is turning on and the steady state compensator 318 is configured to estimate temperature once the thermostat 22 reaches a particular operating state (e.g., steady state). The techniques, systems, and methods described with reference to the startup compensator 316 and the steady state compensator 318 may be interchangeable i.e., the startup compensator 316 is configured to perform the techniques and methods of the steady state compensator 318 and vice versa.

The steady state compensator 318 is configured to receive a measured temperature value from the temperature sensor 312 and the temperature sensor 314. Based on the received temperatures, the steady state compensator 318 is configured to determine a compensated temperature. The steady state compensator 318 is configured to provide the compensated temperature to the HVAC controller 320. Based on a compensated temperature received from the startup compensator 316 and/or the steady state compensator 318, the HVAC controller 320 is configured to control the HVAC equipment 310. The HVAC controller 320 is configured to use the compensated temperature determined by the steady state compensator 318 to compensate for dynamic airflow.

The HVAC controller 320 may use any of a variety of control algorithms (e.g., state-based algorithms, extremum-seeking control algorithms, PID control algorithms, model predictive control algorithms, feedback control algorithms, etc.) to determine appropriate control actions for any HVAC equipment 310 connected to the thermostat 22 as a function of temperature (e.g., the temperature determined by the startup compensator 316 and/or the steady state compensator 318) and/or humidity.

For example, if the temperature determined by the startup compensator 316 and/or the steady state compensator 318 is above a temperature set point received from a touch screen of the thermostat 22, the HVAC controller 320 can control the HVAC equipment 310 to cool the residence 24. Similarly, if the temperature is below the temperature set point, the HVAC controller 320 may cause the HVAC equipment 310 to heat the residence 24. HVAC controller 320 may determine that a humidification or dehumidification component the HVAC equipment 310 should be activated or deactivated to control the ambient relative humidity to a humidity set point for a residence 24.

The HVAC equipment 310 may be the indoor unit 28 and/or the outdoor unit 30 of the residence 24. In some embodiments, the HVAC equipment 310 may be a VAV, a boiler, a chiller, a rooftop unit and/or any other industrial HVAC equipment for a building. The HVAC equipment 310 may be communicably coupled to the thermostat 22 to receive control signals and operate to heat and/or cool a building and/or zone.

Startup Temperature Compensation

Still referring to FIG. 3, the memory 306 is shown to include a startup compensator 316. The startup compensator 316 is configured to receive a measured temperature value from the temperature sensor 314 and/or the temperature sensor 312 and use the measured temperature in determining a temperature offset. The startup compensator 316 is configured to perform temperature compensation for the thermostat 22 during a period of time after the thermostat 22 is turned on.

Measuring temperature in a thermostat may require compensation since components of the thermostat 22 produce heat. When the thermostat 22 is booted, the state of the thermostat 22 may be unknown, i.e., how warm the thermostat is may be unknown. The thermostat 22 may be below, at, or above room temperature. Consequently, without estimation, this unknown may render the thermostat 22 un-reliable for the first hour or more of operation until a steady state is achieved. The startup compensator 316 is configured to compensate for this unknown. The startup compensator 316 is configured to estimate the present state of the thermostat 22 based on a stochastic state estimation and a thermal model. The startup compensator 316 is configured to perform the estimation with a Kalman filter which may allow the thermostat 22 to estimate its current state regardless of the boot state or present time. Consequently, this method is recursive and time invariant in some embodiments.

The continuous transfer function operating on the Laplace transform of the input, Equation 1, is a model by which the startup compensator 316 assumes temperature rises in the thermostat 22 in some embodiments.

$$H(s) = \frac{a}{RC \cdot s + 1} \quad \text{(Equation 1)}$$

In Equation 1, a may be the rise above ambient amplitude and RC can define the pole of a system. These parameters can be chosen based on experimental data. These parameters can be determined by the startup compensator 316 and/or stored by the startup compensator 316 (e.g., programmed into the processing circuit 302). This system can be modeled by the startup compensator 316 using three states which are the heat rise, the measured temperature, and the room temperature. For stochastic state estimation, a state space model is used by the startup compensator 316 in some embodiments. For practical application, this model can be implemented in the Z domain. Further, the thermal model, specifically the heat rise state, can be discretized using the forward difference. The result may be Equation 2.

$$z \cdot T_{HR} = T_{HR} \cdot \left(1 - \frac{1}{RC}\right) + \frac{a}{RC} u \quad \text{(Equation 2)}$$

The state $T_{Measured}$ can be a state that reflects the onboard temperature measurement. The temperature that the startup compensator 316 measures via the temperature sensor 314 and/or the temperature sensor 312 can be the combination of the room temperature and heat rise caused by the thermostat 22. Consequently, $T_{Measured}$ may be Equation 3.

$$z \cdot T_{Measured} = T_{HR} + T_{ZNT} \quad \text{(Equation 3)}$$

The room temperature may be the primary state of interest since it is the true temperature of the room that the thermostat 22 uses to control the HVAC equipment 310, a compensated temperature. The room temperature can be assumed to be static during the boot of the thermostat 22.

$$z \cdot T_{ZNT} = T_{ZNT} \quad \text{(Equation 4)}$$

Based on Equations 1, 2, and 3 the following state space system (Equation 5) can be formulated. The startup compensator 316 is configured to use the state space system, Equation 13, to determine a compensated temperature based on temperature measured by the temperature sensor 314 and/or the temperature sensor 312.

$$\begin{pmatrix} T_{HR}(k+1) \\ T_{ZNT}(k+1) \\ T_{Measured}(k+1) \end{pmatrix} = \quad \text{(Equation 5)}$$

-continued $$\begin{pmatrix} 1 - \frac{\Delta T}{RC} & 0 & 0 \\ 0 & 1 & 0 \\ 1 & 1 & 0 \end{pmatrix} \cdot \begin{pmatrix} T_{HR}(k) \\ T_{ZNT}(k) \\ T_{Measured}(k) \end{pmatrix} + \begin{pmatrix} \frac{a}{RC} \\ 0 \\ 0 \end{pmatrix} \cdot 1$$

It can be shown that this system, Equation 5, is appropriate for state estimation since it is observable. Given that the system is observable and in state space form it can be used by the startup compensator 316 directly with a Kalman filter that can be implemented by the startup compensator 316. The Kalman filter is a filter designed for state estimation given a model and data. This filter provides an optimal state estimate. Consequently, the output of this filter can be used by the thermostat 22 to compensate for the state of the thermostat 22. The following, Equation 14-15, define the parameters for the Kalman filter that the startup compensator 316 is configured to use to determine the zone temperature state. In Equations 6-7, the A, B, C, and D matrices are:

$$A = \begin{pmatrix} 1 - \frac{\Delta T}{RC} & 0 & 0 \\ 0 & 1 & 0 \\ 1 & 1 & 0 \end{pmatrix}, B = \begin{pmatrix} \frac{a}{RC} \\ 0 \\ 0 \end{pmatrix} \quad \text{(Equation 6)}$$

$$C = (0 \ 0 \ 1), D = 0 \quad \text{(Equation 7)}$$

The next parameters that need to be chosen by the startup compensator 316 are the Kalman filter parameters $P_0$ (i.e., a state covariance matrix), Q (i.e., process noise covariance), R (i.e., measurement noise covariance), and $X_0$ (i.e., initial state). The startup compensator 316 is configured to initialize $P_0$, the state covariance matrix, to a high value to allow the Kalman filter to quickly adapt at the start. The startup compensator 316 is configured to initialize Q, the process noise covariance to the identity matrix multiplied by a low scalar (e.g., 0.05). R, the measurement noise, may be a 1×1 matrix since there may only be 1 measurement. Consequently, R may become variance for the sensor of the thermostat 22 (e.g., the temperature sensor 312 and/or the temperature sensor 314). Realistically, R may be about 0.1 degrees Fahrenheit. $X_0$, the initial state, can be estimated by the startup compensator 316 upon a cold start. Consequently, the initial states may be (0, $ZNT_{measured}$, $ZNT_{Measured}$).

Figure 4:
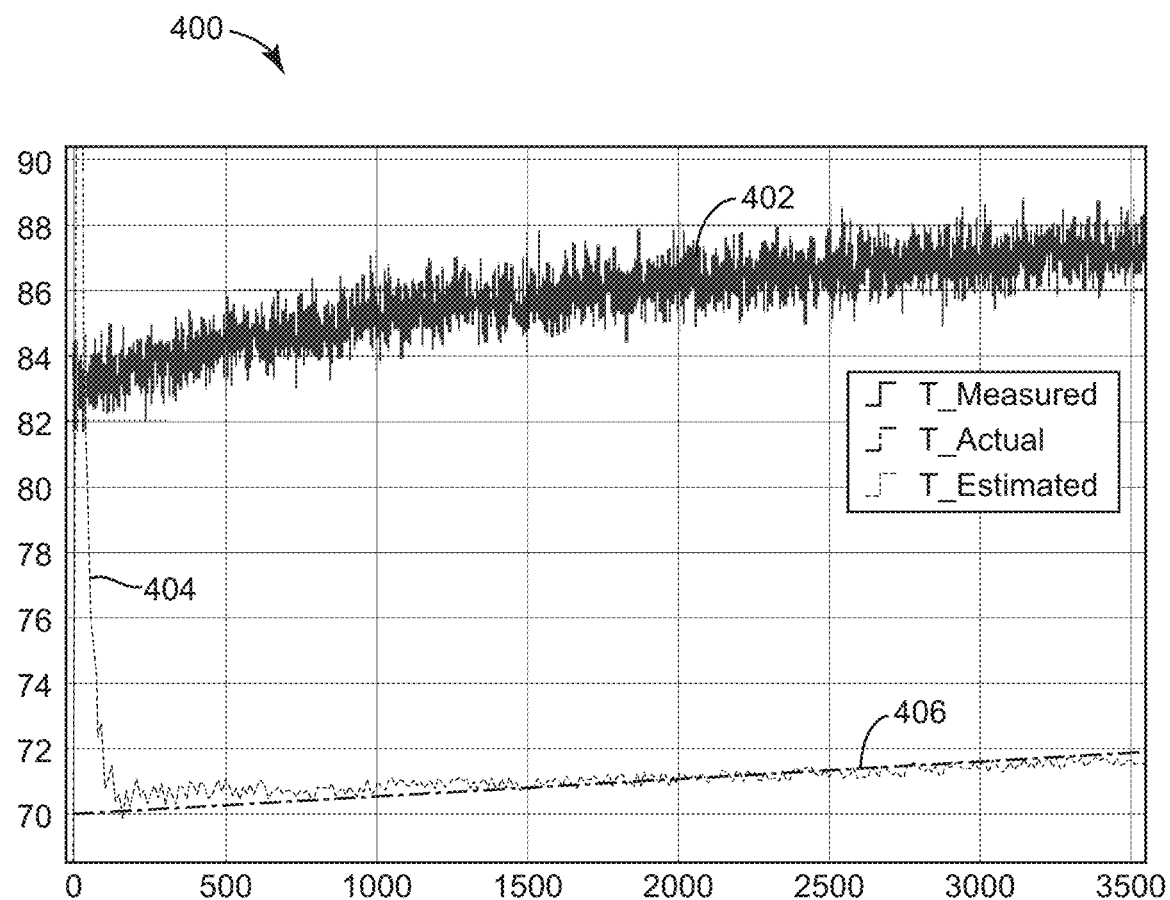
FIG. 4 is a chart illustrating the performance of temperature compensation with a Kalman filter by the thermostat of FIG. 3, where the thermostat is started from a warm state, according to an exemplary embodiment.

Referring now to FIG. 4, a chart 400 illustrating the performance of the Kalman filter implemented by the startup compensator 316 of the thermostat 22 is shown, according to an exemplary embodiment. The chart 400 has lines 402, 404, and 406 deployed on the X axis and Y axis that represent temperature and time, respectively. The line 402 indicates the temperature measured by one of the temperature sensors 312 and 314. The line 404 illustrates the compensated temperature determined by the startup compensator 316 based on the Kalman filter and the measured temperature illustrated by the line 402. The line 406 illustrates the actual temperature for comparison between the measured temperature of the temperature sensor 402 and the compensated temperature 404.

The chart 400 illustrates an example where a drifting sensor (e.g., the temperature sensor 312 and/or the temperature sensor 314) is used as an input into the estimator of the startup compensator 316. As can be seen in chart 400, the Kalman filter quickly identifies the state of the thermostat 22 and compensates for the temperature offset and noise resulting in an accurate temperature measurement. The exemplary system was constructed with a heat rise offset of 15.5 degrees and a time constant of 900. Normally distributed noise with a variance of 0.2 was added to the measurement in addition to a 2 degree per hour temp rise.

In chart 400, the thermostat 22 is started from a warm state and consequently there is a significant offset error on the temperature sensor. Using the filter, the temperature determined by the thermostat quickly converges to the correct temperature despite the offset and noise.

Figure 5:
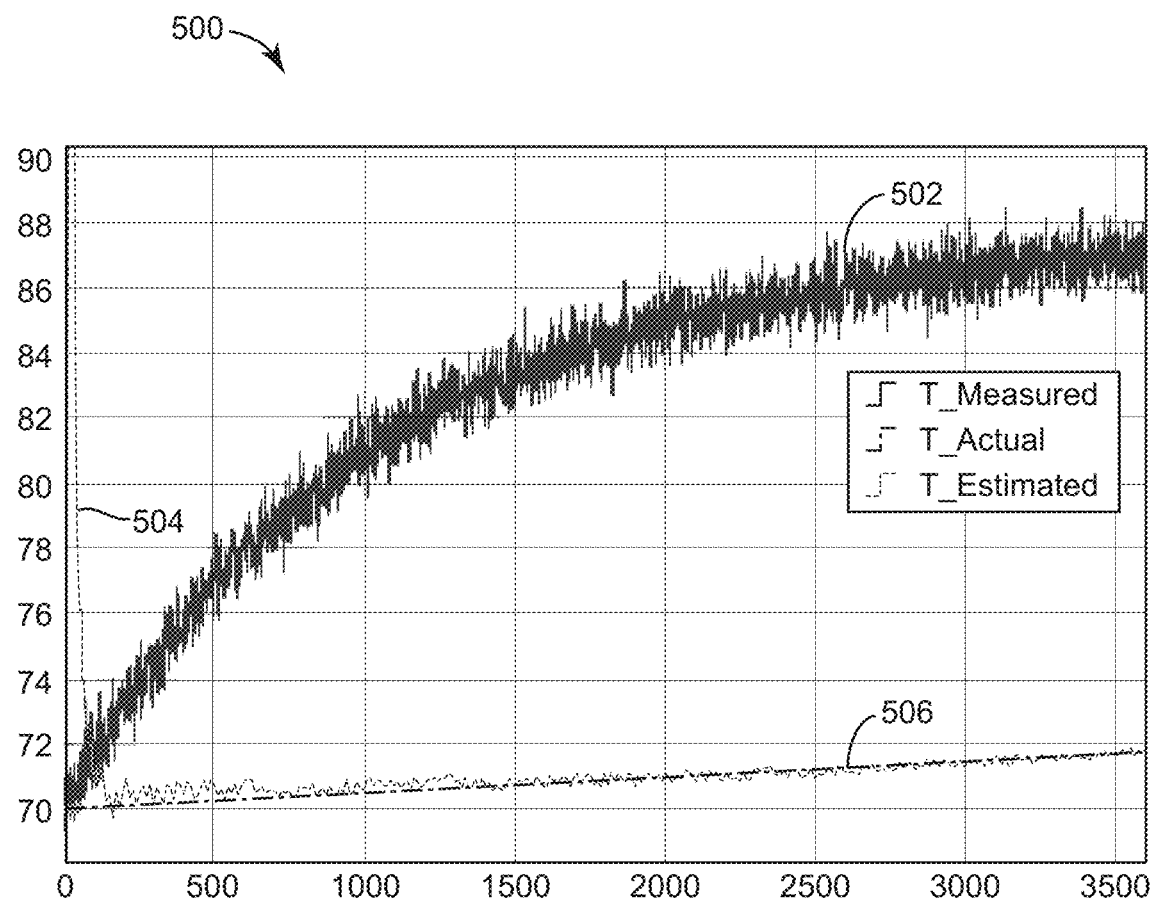
FIG. 5 is a chart illustrating the performance of temperature compensation with a Kalman filter by the thermostat of FIG. 3, where the thermostat is started from a cold state, according to an exemplary embodiment.

Referring now to FIG. 5, a chart 500 illustrates the performance of the Kalman filter implemented by the startup compensator 316 of the thermostat 22 when the thermostat 22 is started from a cold start, e.g., when the thermostat 22 is at room temperate when being powered up is shown, according to an exemplary embodiment. The chart 500 has lines 502, 504, and 506 deployed on the X axis and Y axis that represent temperature and time, respectively. The line 502 indicates the temperature measured by one of the temperature sensors 312 and 314. The line 504 illustrates the compensated temperature determined by the startup compensator 316 based on the Kalman filter and the measured temperature illustrated by the line, 502. The line 506 illustrates the actual temperature for comparison between the measured temperature of a temperature sensor (e.g., the temperature sensor 314 and/or the temperature sensor 312) and the compensated temperature 504.

Referring again to FIG. 3, the startup compensator 316 is configured to generate a compensated temperature value based on Non-Linear Least Squares (NLSQ). The startup compensator 316 can, in some embodiments, determine the compensated temperature with NLSQ instead of a Kalman filter. The approach to determining the compensated temperature with NLSQ may be generally referred to herein as the "NLSQ method" and the startup compensator 316 is configured to implement this method. The NLSQ method is a time invariant method in some embodiments. A time variable or measure is not required to perform temperature estimation using the NLSQ method in some embodiments.

The NLSQ method for determining the compensated temperature may be a more optimal state estimation solution than the Kalman filter. The NLSQ method may provide increased accuracy at the expense of computational power available by the processing circuit 302 of the thermostat 22. The NLSQ method may make use of an array of data collected over time and simultaneously optimize against all the points collected. This optimization can estimate the initial state of the thermostat 22. Once the initial state is known, a state space model (e.g., the state space model of Equations 14 and 15) can be executed indefinitely during operation.

In some embodiments, there may be three known values/models for the NLSQ method. For example, first, a state space model or linear model such as the model of Equations 14 and 15 that models heat rise in the thermostat 22. Second, a predefined number of temperature samples (e.g., n samples e.g., 500 data points or any other number of samples). The predefined number of samples can be collected by either or both of the temperature sensor 314 and the temperature sensor 312. Third, the temperature of the room that the thermostat 22 is located in is not rapidly changing with respect to the time-constant of the model.

The NLSQ method, as implemented by the startup compensator 316 can determine what is the initial state of the Heat Rise State (T_HR) at boot and what is the current heat rise state. The NLSQ method can be used to optimally determine the state of the state space model (e.g., the model defined by Equations 14 and 15). When the NLSQ method is used, multiple solutions may occur due to non-convexity. Consequently, a reliably accurate estimation of the initial state of the thermostat 22 may be required. One estimation of the initial state of the thermostat 22 may be Equation 8, $$\theta_0 = \begin{bmatrix} a/2 \\ T_{Measured}(0) - a/2 \\ T_{Measured}(0) \end{bmatrix} \quad \text{(Equation 8)}$$

Next a residual (error) function may be used by the NLSQ method. The residual function may determine a temperature error. This temperature error can be recursively calculated from the state space model (e.g., as defined by Equations 6 and 7) and the set of n temperature samples collected by either or both of the temperature sensor 314 and the temperature sensor 312, $$
\begin{aligned}
&f(\theta)\{\\
&\quad x = \theta\\
&\quad \text{for } i = 1 : n\\
&\quad\quad x = Ax + Bu_i\\
&\quad\quad y_{|i,1|} = Cx + Du_i\\
&\quad r = T_{Measured} - y\\
&\}\ (\text{Equations 9 - 15})
\end{aligned}
$$

With this residual function, the startup compensator 316 can operate on the parameters to produce an optimal estimate of the heat rise. The following is a NLSQ implementation of the Levenberg Marquardt algorithm that can act on the residual function provided above. This method can either run for a fixed number of iterations with "iterationCount" or break upon parameter convergence (e.g., convergence of the heat rise).

$$e = 10^{-10} \quad \text{(Equation 16-25)}$$

for $i = 1 : interationCount$ $r_k = f(\theta)$ $J_k = \dfrac{r(\theta_k - \epsilon) - r(\theta_k)}{\epsilon}$ $p_k = (J_k^T J_k + \lambda_k I)^{-1} J_k^T r_k$ if $(r_k(\theta_k) > r_k(\theta_k + p_k))$ $\theta_{k+1} = \theta_k + p_k$ $\lambda_{k+1} = \lambda_k * 0.1$ else $\lambda_{k+1} = \lambda_k * 10$ Referring now to FIG. 6, a chart 600 illustrating a turn on profile of the thermostat 22 as well as a 500 sampled temperature data points, according to an exemplary embodiment. The sampled temperature data 602 can be temperature measurements made by either or both of the temperature sensor 314 and the temperature sensor 312. These sampled data points can be used to determine a heat rise value with the NSLQ method. The temperature predicted by the temperature model is illustrated by curve 604.

Figure 7:
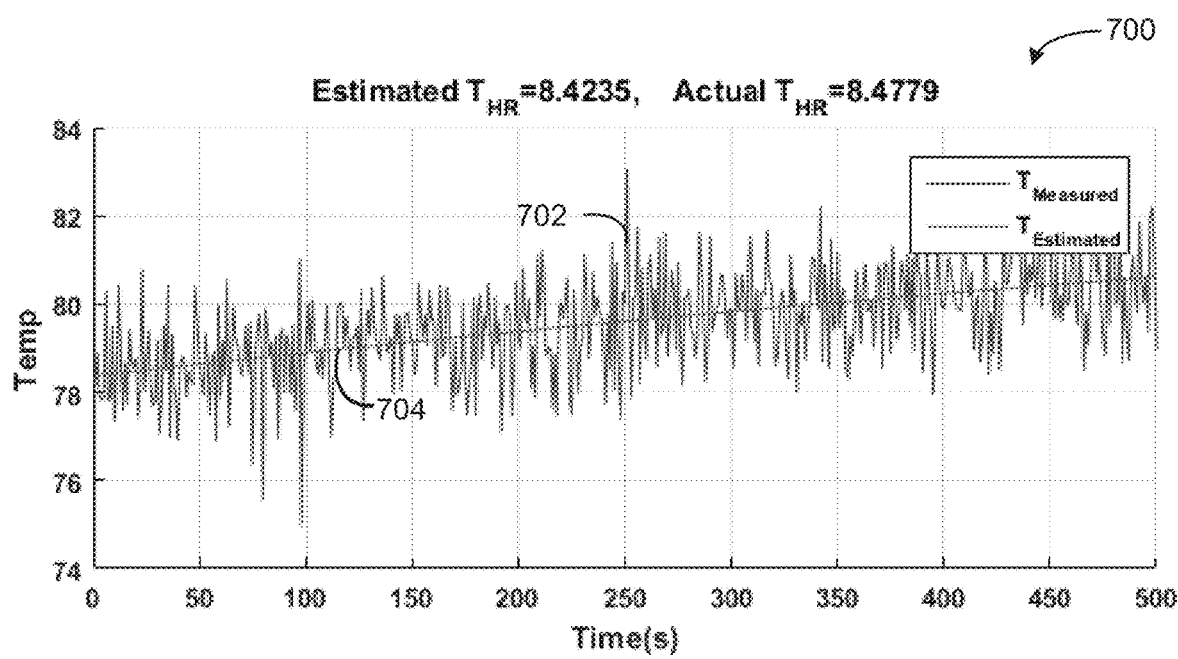
FIG. 7 is a chart illustrating the performance of the startup temperature compensator of the thermostat of FIG. 3 using NLSQ, according to an exemplary embodiment.

Referring now to FIG. 7 a chart 700 illustrating measured temperature and temperature estimated by the startup compensator 316 using NLSQ is shown, according to an exemplary embodiment. Chart 700 illustrates using the NLSQ method to estimate the initial state of the state space model. The measured temperature 702 may be the temperature measured by either or both of the temperature sensor 314 and the temperature sensor 312. The estimated temperature 704 of chart 700 is the temperature determined by the startup compensator 316 using the NLSQ method. The estimated heat rise as determined by the startup compensator 316 using the NLSQ method is 8.4235 degrees Fahrenheit while the actual heat rise is 8.4779 degrees Fahrenheit.

Figure 8:
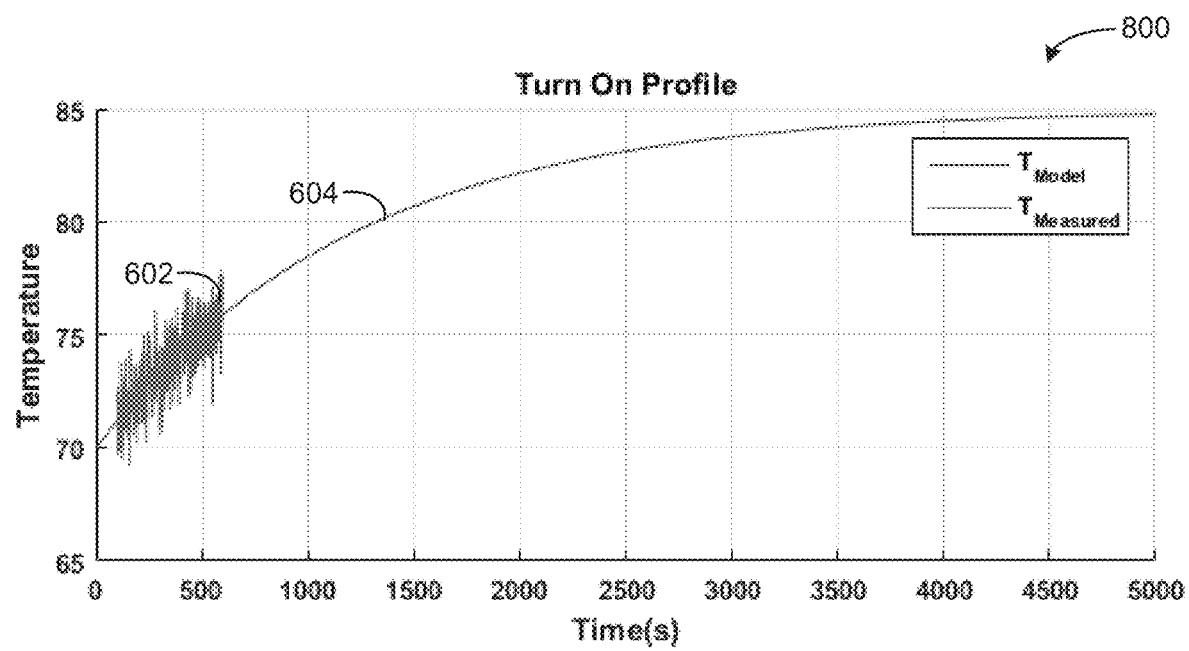
FIG. 8 is a chart illustrating a temperature model and collected data that can be used by the startup temperature compensator of the thermostat of FIG. 3 to an ambient temperature with the NLSQ technique when the thermostat of FIG. 3 is started from a cold state, according to an exemplary embodiment.
Figure 9:
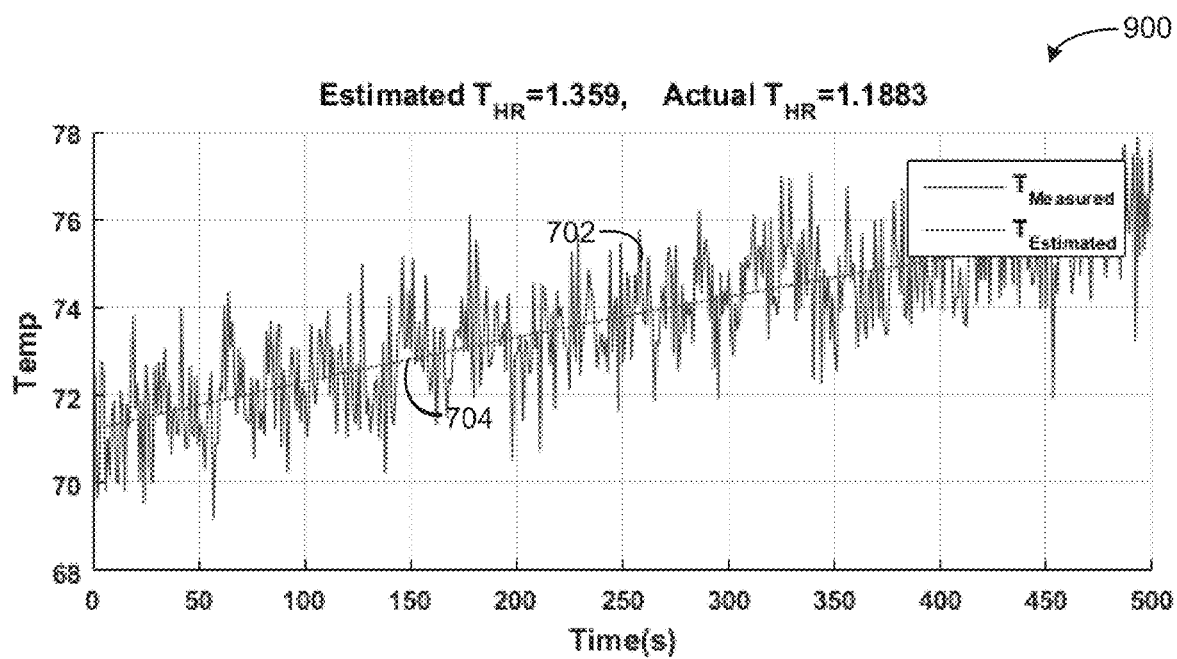
FIG. 9 is a chart illustrating the performance of the startup compensator for the thermostat of FIG. 3 that can determine an ambient temperature with NLSQ when the thermostat of FIG. 3 is started from a cold state, according to an exemplary embodiment.

Referring now to FIGS. 8 and 9, charts 800 and 900 illustrate a turn on profile of the thermostat 22 and temperature data points collected by the thermostat 22 close to when the thermostat 22 boots. FIGS. 8 and 9 are an example of identifying a cold start of the thermostat 22. The estimated heat rise temperature is 1.359 degrees Fahrenheit while the actual heat rise temperature is 1.1883 degrees Fahrenheit.

As can be observed through FIGS. 6-9, the NLSQ method is able to determine the state of the model. The advantage of NLSQ is that it can perform better than a Kalman filter. NLSQ can handle noise better than the Kalman filter and is less dependent on the few initial samples fed into the filter. The computations for the NLSQ method can be performed after a sufficient number of samples have been collected or can be performed continuously once each new sample is obtained.

Steady State Temperature Compensation

Referring again to FIG. 3, the steady state compensator 318 is configured to implement various empirical models to determine the compensated temperature from the temperatures measured by the temperature sensor 312 and the temperature sensor 314 while the thermostat 22 is operating, i.e., after it has booted up and is in a steady state.

Temperature Estimation Via Two Temperature Sensors

Figure 10:
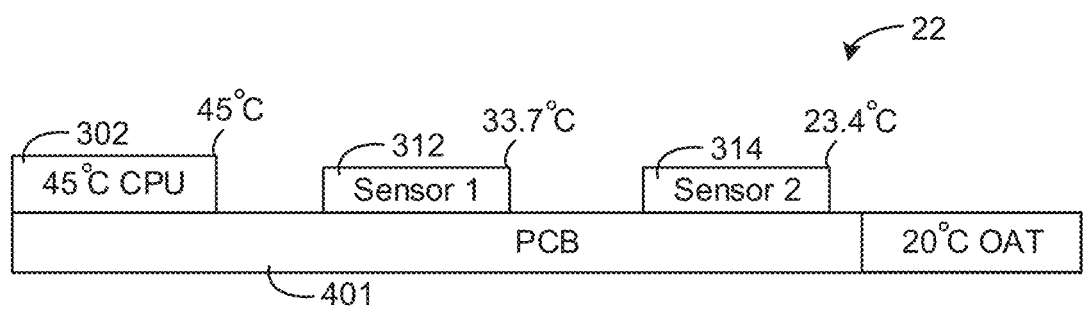
FIG. 10 is a block diagram of the thermostat of FIG. 3 that includes two temperature sensors and a heat generating component, according to an exemplary embodiment.
Figure 11:
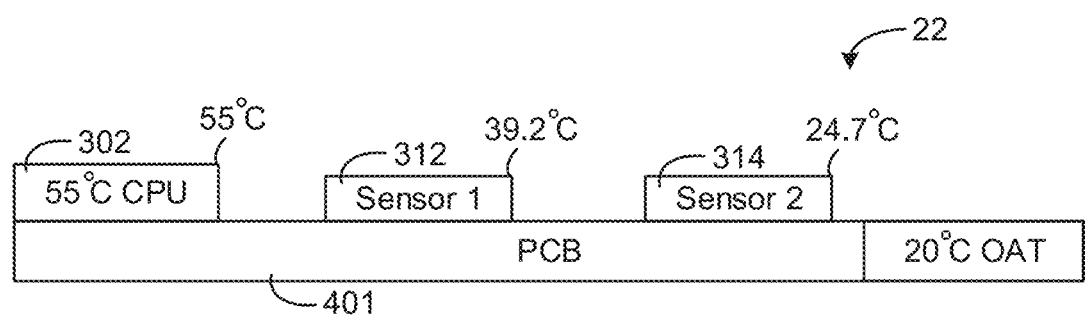
FIG. 11 is another block diagram of the thermostat of FIG. 3 that includes two temperature sensors and a heat generating component, according to an exemplary embodiment.

A thermal model can be implemented by the steady state compensator 318 such that the difference in temperature between two temperature sensors can be used to estimate the temperature of the thermostat 22. FIGS. 10-11, as discussed in greater detail herein, illustrate the two temperature sensors. The thermal model can compensate for heat generated by the processing circuit 302 and varying amount of airflow acting on the thermostat 22. Any number of temperature values measured by temperature sensors (e.g., three, four, five, etc.) can be used by the thermal model and included in the thermostat 22.

A single sensor may be agnostic of airflow and the thermostat 22 may not be able to differentiate between a change in room temperature and a change in temperature due to airflow with only one temperature sensor. However, with two sensors, the difference between the two temperature readings can be correlated by the thermostat 22, i.e., by the steady state compensator 318, to airflow. The steady state compensator 318 is configured to use a linear relationship to model the temperature and/or a non-linear model of any order.

With stochastic sampling and least squares, the steady state compensator 318 is configured to generate and/or utilize a model operating on temperature difference to compensate for airflow. Equations 6 and 8 may be the model that the steady state compensator 318 is configured to generate and/or use to model temperature values.

In Equation 26, the parameter A may be determined by the steady state compensator 318 by taking the difference of the temperatures measured by the temperature sensor 312 and the temperature sensor 314. The parameters, θ, may be a column vector of 1 by n values (e.g., 2 values, 3 values, 4 values, 5 values, etc.) that can be fit via any fitting algorithm (e.g., least squares) (Equation 27). The parameters can be determined by the steady state compensator 318 and/or can be received and stored by the steady state compensator 318 (e.g., when the steady state compensator 318 is programmed).

In Equation 33, the dot product of the Jacobian, i.e., a row vector of powers of $\Delta$, and the column vector of $\theta$ can be performed by the steady state compensator 318 to determine an estimated rise above ambient temperature, $\hat{y}$ (e.g., $\hat{y}=\theta_3\Delta^3+\theta_2\Delta^2+\theta_1\Delta^1+\theta_0\Delta^0$ or $\hat{y}=\theta_n\Delta^n+\theta_{n-1}\Delta^{n-1}+\theta_{n-2}\Delta^{n-2} \ldots +\theta_0\Delta^0$). The estimated rise above ambient temperature can be subtracted from a measured ambient temperature (e.g., the ambient temperature measured by the temperature sensor 314 and/or the temperature sensor 312) to determine a compensated temperature value.

| | |
|---|---|
| $J$: Jacobian | (Equation 26) |
| $\theta$: Model Parameters | (Equation 27) |
| $\Delta$: Temperature Difference | (Equation 28) |
| $y$: Observed Rise Above Ambient | (Equation 29) |
| $\hat{y}$: Estimated Rise Above Ambient | (Equation 30) |
| $J=[\Delta^n \Delta^{n-1} \Delta^{n-2} \ldots \Delta^0]$ | (Equation 31) |
| $\theta=(J^T J)^{-1} J^T y$ | (Equation 32) |
| $\hat{y}=J*\theta$ | (Equation 33) |

Referring now to FIGS. 10-11, temperature within the thermostat 22 is shown for varying amounts of airflow acting on the thermostat 22, according to an exemplary embodiment. A circuit board 401 of the thermostat 22 may be a printed circuit board (PCB) that the processing circuit 302, the temperature sensor 314, and the temperature sensor 312 are located. As shown in FIGS. 10-11, a CPU (i.e., the processing circuit 302) is located in a line with a first temperature sensor (i.e., the temperature sensor 312) and a second temperature sensor (i.e., the temperature sensor 314).

FIGS. 10-11 illustrate conductive heat being transferred from the processing circuit 302 to the outside ambient air in varying amounts. The temperature measured by the temperature sensors may be influenced by the amount of airflow acting on the thermostat 22. However, based on the steady state compensator 318, the temperature values measured by the two temperature sensors can be used to determine an estimate of true air temperature.

Figure 12:
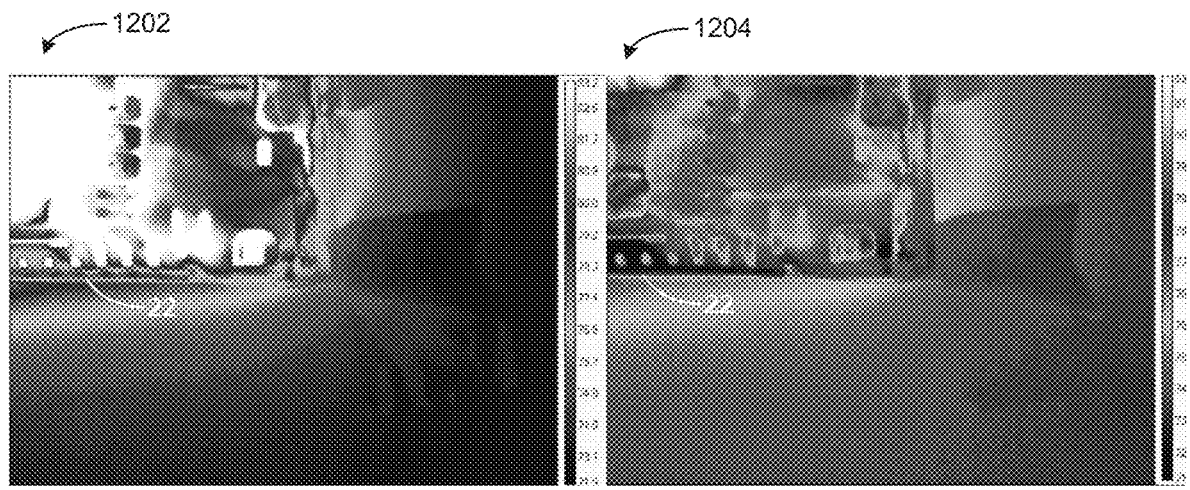
FIG. 12 is a diagram illustrating temperature within the thermostat with varying amounts of airflow acting on the thermostat of FIG. 3, according to an exemplary embodiment.

Referring now to FIG. 12, two thermographic images of the thermostat 22 with different amounts of airflow acting on the thermostat 22 are shown. In thermographic image 1202 a first amount of airflow is present. This amount of airflow may be low, causing the thermostat to heat up. In thermographic image 1204, a higher amount of airflow may be present causing the heat within the thermostat 22 to be dissipated.

Figure 13:
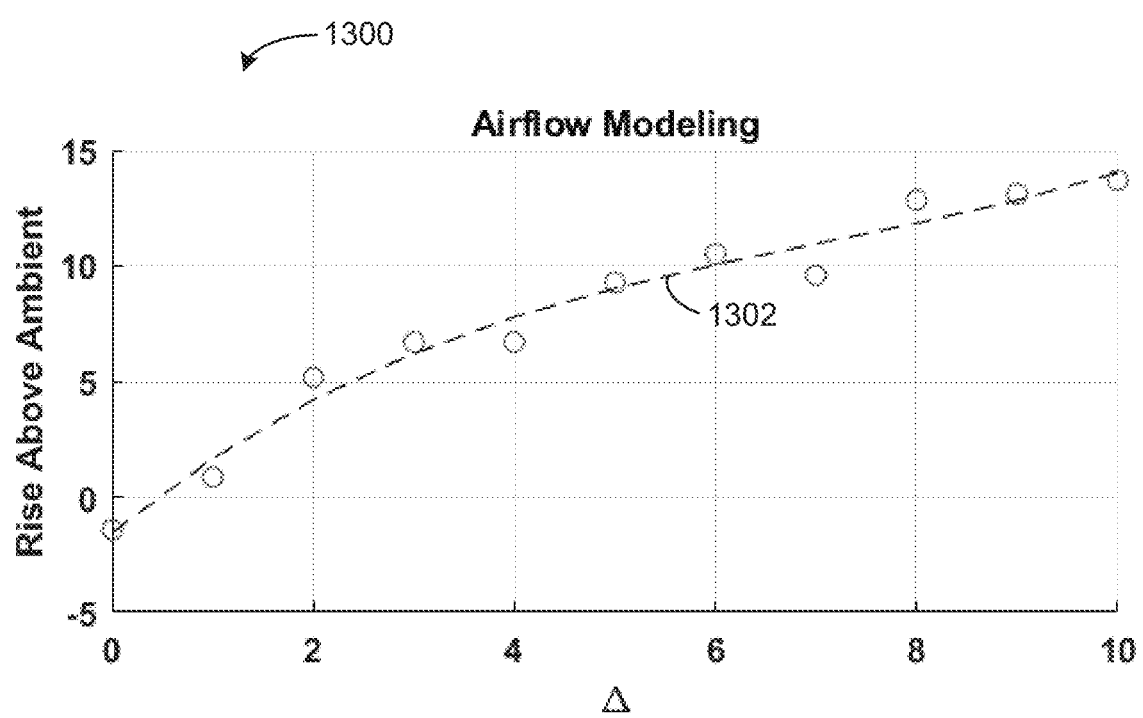
FIG. 13 is a chart illustrating the performance of an airflow model that can be used by the thermostat of FIG. 3 to determine an ambient temperature, according to an exemplary embodiment.

Referring now to FIG. 13, a chart 1300 illustrates the performance of the steady state compensator 318 operating with the airflow model described with references to Equations 26-33. On the x-axis of chart 1300, the difference in temperature between the temperature sensor 312 and the temperature sensor 314 is shown. The rise above ambient is shown on the y-axis. The circles on chart 1300 illustrate measured rise above ambient for various temperature differences, $\Delta$. The dashed curve, curve 1302, illustrates the determination of rise above ambient determined by the steady state compensator 318. The measurements indicated by the circles can be used (e.g., used by the steady state compensator 318) to fit the airflow model i.e., to fit the parameters, θ, of the airflow model.

Figure 14:
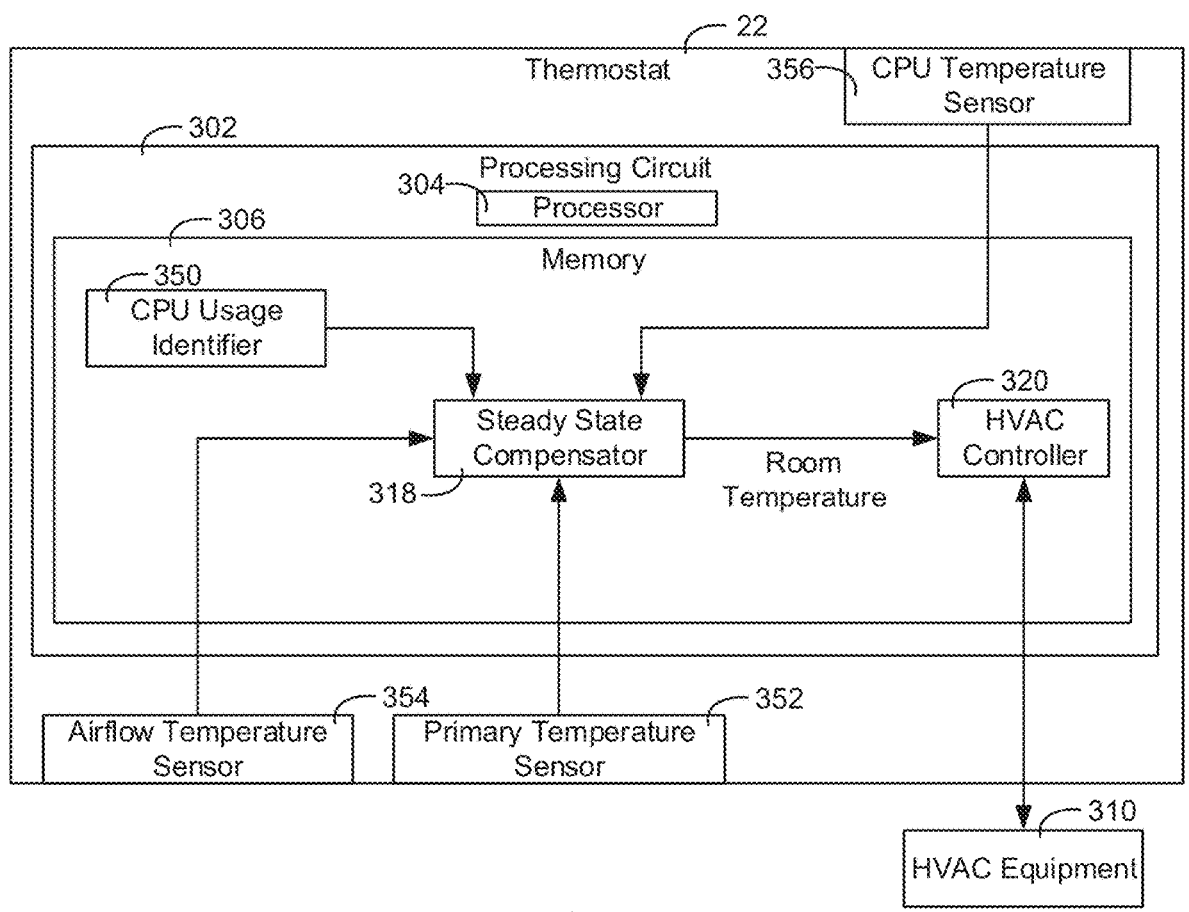
FIG. 14 is another block diagram of the thermostat of FIGS. 1A and 1B that can include a steady state temperature compensator that is configured to determine a room temperature by accounting for airflow and heat rise caused by heat generating components of the thermostat, according to an exemplary embodiment.

Temperature Estimation Via Three Temperature Sensors and Central Processing Unit (CPU) Usage Referring now to FIG. 14, a block diagram of the thermostat 22 of FIG. 1A is shown including the steady state compensator 318 and three temperature sensors, according to an exemplary embodiment. The steady state compensator 318 is configured to perform temperature compensation for the thermostat 22 while the thermostat 22 is operating in a steady state, a predefined amount of time after being turned on. The three temperature sensors include a central processing unit (CPU) temperature sensor 356, an airflow temperature sensor 354, and a primary temperature sensor 352. Based on temperature measurements of the three temperature sensors and/or a CPU usage amount of the processing circuit 302, the steady state compensator 318 is configured to determine a compensated temperature.

Many thermostats with smart features that are processor intensive often struggle to measure room temperature accurately due to onboard electronics that generate heat. The systems and methods as described with reference to FIG. 14 and elsewhere herein provide compensation for internal heat rise such that room temperature can be measured accurately despite multiple internal heat sources and dynamic heat loads.

The CPU temperature sensor 356, the airflow temperature sensor 354, and the primary temperature sensor 352 may be temperature sensors that are similar to, or the same as, the temperature sensor 314 and/or the temperature sensor 312 as described with further reference to FIG. 3. Multiple data sources (e.g., the temperatures measured by the CPU temperature sensor 356, the airflow temperature sensor 354, and the primary temperature sensor 352) can be used by the steady state compensator 318 to create a more accurate temperature signal estimate. In some embodiments, some of these data sources are uniquely coupled to transients and parasitics that need to be eliminated to more accurately determine temperature. For example, the airflow temperature sensor 354 may be coupled to varying amounts of airflow acting on the thermostat 22 while the CPU temperature sensor 356 may be coupled to varying amounts of heat dissipated by the processing circuit 302.

In some cases, the primary temperature transients are dynamic processor power dissipation and changes to airflow in the operating environment of the thermostat 22. These transients can account for temperature error in the amount of ±10° F. or more depending upon the conditions. The steady state compensator 318 can use data signals in Table 1 below to determine the compensated temperature. The signals CPU usage 1502, CPU temperature 1504, airflow temperature 1506, and primary temperature 1508 shown in Table 1 below are described with further reference to FIGS. 15 and 16.

TABLE 1

| Signals For Temperature Compensation | | |
| --- | --- | --- |
| Signal | Description | Units |
| CPU Usage 1502 | Current CPU usage of the thermostat 22 determined by a CPU usage identifier 350 | 0-100% |
| CPU Temperature 1504 | Temperature measured by the CPU temperature sensor 356 | Degrees Fahrenheit |
| Airflow Temperature 1506 | Temperature measured by the airflow temperature sensor | Degrees Fahrenheit |

TABLE 1-continued

| Signals For Temperature Compensation | | |
| --- | --- | --- |
| Signal | Description | Units |
| Primary Temperature 1508 | 354 Temperature measured by the primary temperature sensor 352 | Degrees Fahrenheit |

The CPU temperature sensor 356 may be a temperature sensor that is placed on the PCB 401 very close to the processing circuit 302 so that the temperature measured by the CPU temperature sensor 356 takes into account the heat generated by the processing circuit 302. In some embodiments, the CPU temperature sensor 356 is an internal temperature sensor of the processing circuit 302. The CPU temperature sensor 356 may be a negative temperature coefficient (NTC) thermistor or any other type or combination of temperature sensors described herein or known for use in measuring temperature.

The airflow temperature sensor 354 can be a temperature sensor placed on the PCB 401 that is placed close to a heat generating component of the PCB 401. The heat generating component can be a specific circuit or component (e.g., a resistor, a transistor, an integrated circuit (IC), a triac, a relay, etc.) that generates heat in the thermostat 22. The airflow temperature sensor 354 can be a bandgap precision temperature sensor or any other type or combination of temperature sensors described herein or known for use in measuring temperature. The airflow temperature sensor 354 and the heat generating component may form a hot wire anemometer. Therefore, the temperature measured by the airflow temperature sensor 354 may be correlated to the amount of airflow within the thermostat 22.

The primary temperature sensor 352 can be a temperature sensor that is isolated from heat generating components of the thermostat 22 and is placed on the PCB 401. The primary temperature sensor 352 can be a bandgap precision temperature sensor or any other type or combination of temperature sensors described herein or know for use in measuring temperature. Based on the signals in Table 1 above, the thermostat 22 is configured to perform temperature compensation for dynamic power dissipation and changes in airflow.

The processing circuit 302 may be the primary source of power dissipation in the thermostat 22. Specifically, the processing circuit 302 may include a CPU (e.g., the processor 304), a graphics processing unit (GPU), a memory 306 (e.g., RAM), that generate heat within the thermostat 22. The power dissipation of these components may vary significantly based upon their utilization. The steady state compensator 318 is configured to use two different signals to compensate for the changes in CPU power dissipation, i.e., the CPU usage 1502 and the CPU temperature 1504.

The CPU power dissipation can be monitored via a software module, i.e., the CPU usage identifier 350. The CPU usage identifier 350 is configured to determine the CPU usage 1502. The CPU usage 1502 may be based on the current amount of data stored in the memory 306, the current amount of processing jobs that the processor 304 is executing, the current number of algorithms being run by the processing circuit 302, etc. The CPU usage 1502 may be correlated to how much power the processing circuit 502 is dissipating. Furthermore, the CPU temperature 1504 measured by the CPU temperature sensor 356 may be indicative of power dissipation of the processing circuit 502 and can be used to account for the power dissipation of the processing circuit 502. Together, the CPU usage 1502 and the CPU temperature 1504 can be used by the steady state compensator 318 to model and eliminate heat rise due to the processing circuit 502.

The thermostat 22 may experience different amounts of airflow. Airflow can significantly change the temperature characteristics of the thermostat 22, e.g., the internal heat rise of the thermostat 22. The internal heat rise of the thermostat 22 often decreases as more airflow is circulated around an enclosure of the thermostat 22. Examples of varying amounts of airflow acting on a thermostat can be seen in FIG. 12. Thermal image 1202 illustrates the thermostat 22 without significant airflow while the thermal image 1204 illustrates the thermostat 22 with significant airflow.

To compensate for airflow acting on the thermostat 22, a temperature sensor (e.g., the airflow temperature sensor 354), can be used with a heat source to create a hot wire anemometer. The heat source may be a low thermal mass such that small changes in airflow correlate to large changes in temperature measured by the airflow temperature sensor 354. This system, the airflow temperature sensor 354 and the heat source, creates a high fidelity signal (e.g., the airflow temperature 1506) that is coupled to airflow. In some embodiments, this hot wire anemometer is created by placing a bandgap temperature sensor (e.g., the airflow temperature sensor 354) nearby a resistor, i.e., the heat source. In some embodiments, the PCB 401 is configured such that the airflow temperature sensor 354 has minimal thermal mass.

Figure 15:
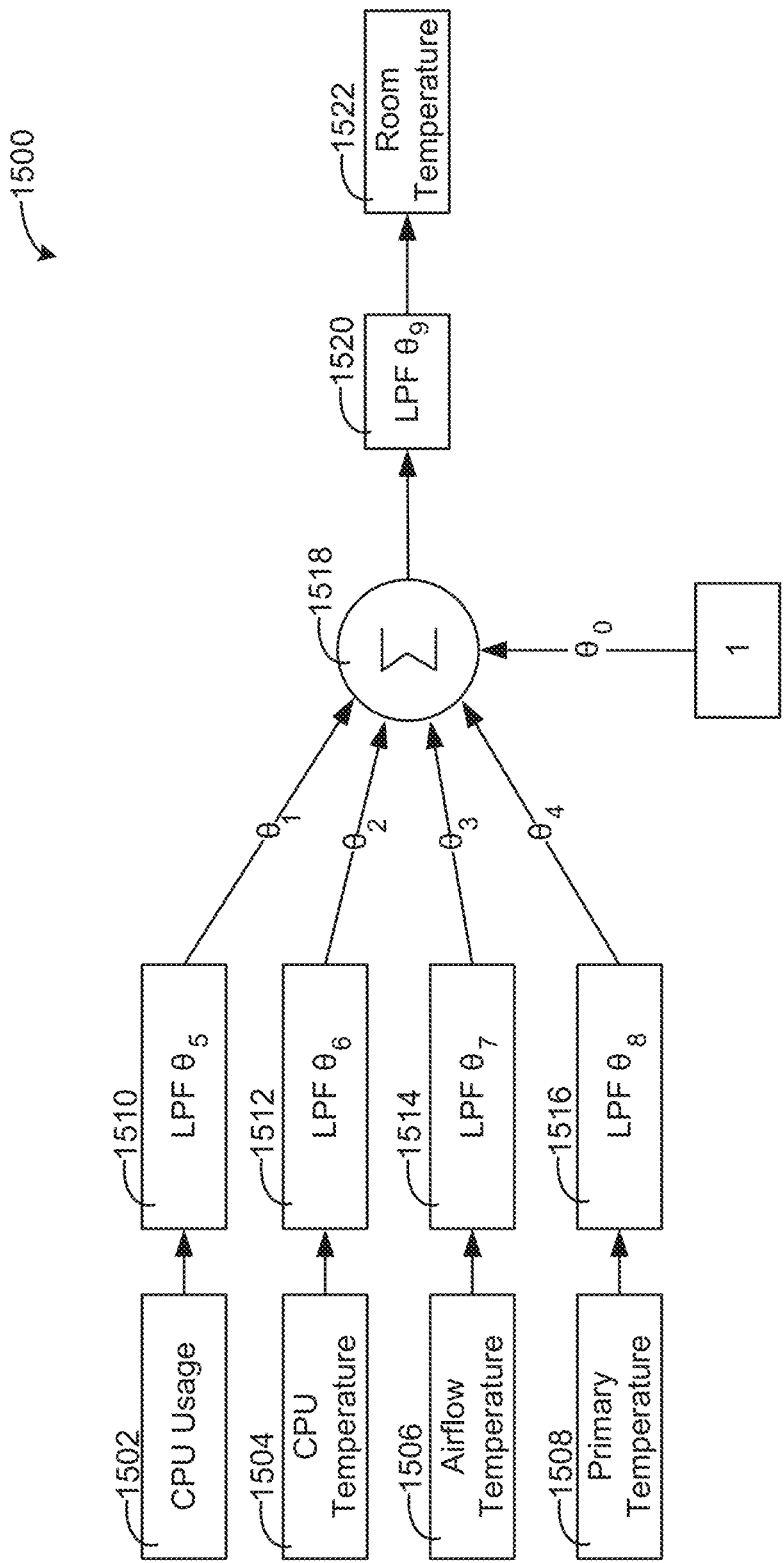
FIG. 15 is a block diagram of a model that the steady state temperature estimator of FIG. 14 is configured to implement, according to an exemplary embodiment.
Figure 16:
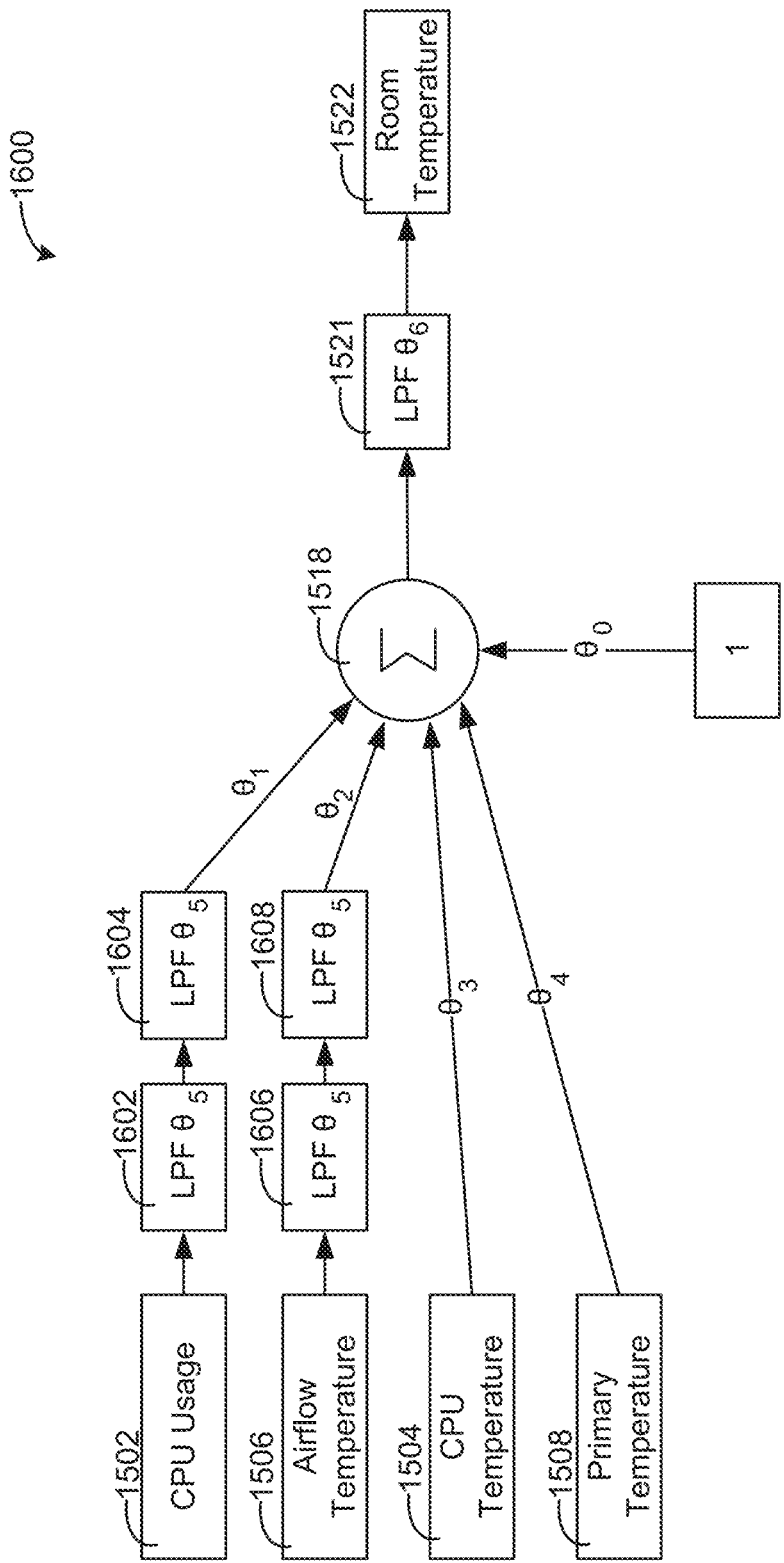
FIG. 16 is a block diagram of a model with reduced parameters that the steady state temperature estimator of FIG. 14 is configured to implement, according to an exemplary embodiment.

Referring now to FIGS. 15 and 16, models 1500 and 1600 that the steady state compensator 318 is configured to generate and/or use to determine a compensated temperature (the room temperature 1522) are shown, according to exemplary embodiments. The models 1500 and 1600 can be dynamics models that can be generated and/or stored by the steady state compensator 318. The models 1500 and 1600 include gains on the various inputs (e.g., the signals of Table 1) as well as input and output filtering.

Referring more particularly to FIG. 15, the model 1500 is shown for determining a compensated temperature, the room temperature 1522, based on the signals CPU usage 1502, the CPU temperature 1504, the airflow temperature 1506, and/or the primary temperature 1508. The model 1500 is shown to include various parameter values (weights) and various filters. The steady state compensator 318 is configured to generate (train) the model 1500 and is configured to execute the model 1500 to determine the room temperature 1522.

In the model 1500, the parameters $\theta_1$ through $\theta_4$ can represent the gain or the amount of effect for the each of the signals. The parameters $\theta_5$ through $\theta_9$ can be used to determine the dynamics of each of the signals, i.e., may be parameters for the filters of the model 1500. The result of passing the various signals through the LPF filters 1510-1516 shown in FIG. 15 can be multiplied by various weights (i.e., $\theta_1$ through $\theta_4$) and then summed by summation block 1518. Summation block 1518 can include a predefined offset i.e., $\theta_0$ in the summation. The output of the summation can be filtered by a LPF 1520 to determine the room temperature 1522. The steady state compensator 316 is configured to use various optimizations to avoid over-fitting the model 1500 with unnecessary parameters depending upon the data used to train the model. The model 1600 as shown in FIG. 16 illustrates the model 1600 with reduced parameters.

In the model 1600, the parameters $\theta_1$ through $\theta_4$ can represent the gain or the amount of effect for the each of the signals. The parameters $\theta_5$ and $\theta_6$ can be used to determine the dynamics of the CPU usage 1502, the airflow temperature 1506, and the result of the summation block 1518 respectively. In FIG. 16, some of the signals, i.e., the CPU usage 1502 and airflow temperature 1506 are filtered twice. The CPU usage 1502 can be filtered by the LPF 1602 and the LPF 1604 while the airflow temperature 1506 can be filtered by the LPF 1606 and the LPF 1608. In the model 1600, the CPU temperature 1504 and the primary temperature 508 are not filtered and rather directly multiplied by their respective weights. Summation block 1518 can sum the CPU temperature 1504 multiplied by $\theta_3$ and the primary temperature 1508 multiplied by $\theta_4$ with the twice filtered signals for the CPU usage 1502 and the airflow temperature 1506. In some embodiments, the summation block 1518 includes a constant in the summation, $\theta_0$. The result of the summation of block 1518 can be filtered by LPF 1521 to produce the room temperature 1522.

In FIGS. 15 and 16, the models 1500 and 1600 include low pass filters (LPFs) 1510-1516 (model 1500), LPF 1521 (model 1600), and 1602-1608 (model 1600). The LPFs account for the dynamics of the signals input into the models 1500 and 1600 and/or the output signal. The parameters of the models 1500 and 1600 can be trained (determined) through various statistical methods. The statistical methods may include one or more, or a combination of, linear least squares, nonlinear least square, robust linear least squares, robust non-linear least squares, and variants least squares.

The parameters for the models 1500 and 1600 can be gains that define the effect of each of the signals. The model 1500 can be represented by Equations 34-39, $$CPU(k)=CPU(k-1)+\theta_5(CPU_{Raw}(k)-CPU(k-1))$$

$$T_{CPU}(k)=T_{CPU}(k-1)+\theta_6(T_{CPU\;Raw}(k)-T_{CPU}(k-1))$$

$$T_{Airflow}(k)=T_{Airflow}(k-1)+\theta_7(T_{Airflow\;Raw}(k)-T_{Airflow}(k-1))$$

$$T_{Primary}(k)=T_{Primary}(k-1)+\theta_8(T_{Primary\;Raw}(k)-T_{primary}(k-1))$$

$$T_{RoomRaw}(k)=\theta_0+\theta_1 CPU(k)+\theta_2 T_{CPU}(k)+\theta_3 T_{Airflow}(k)+\theta_4 T_{Primary}(k)$$

$$T_{Room}(k)=T_{Room}(k-1)+\theta_9(T_{RoomRaw}(k)-T_{Room}(k-1)) \text{(Equations 34-39)}$$

The following is an example solution for training and using the models 1500 and/or 1600. The steady state compensator 318 is configured to perform the following example and/or various variations of the following example. In some embodiments, the exemplary solution obtains nearly optimal parameter values for a given compensation model (e.g., the models 1500 and 1600). The steady state compensator 318 is configured to perform least squares, nonlinear least squares, robust least squares, and/or robust nonlinear least squares to identify (determine) parameters for the models 1500 and 1600. The following examples use nonlinear least squares and least squares to determine values for the parameters, however, the steady state compensator 318 is configured to use any one or combination of statistical methods to identify the parameters.

In the model, $\theta_0$ through $\theta_4$ are coefficients that are initially determined through Linear Least Squares. By ignoring the other parameters of the model, the partial derivative of the model with respect to each parameter is denoted as a Jacobian (J) shown in Equation 40, $$J = \begin{bmatrix} 1 & CPU(1) & T_{CPU}(1) & T_{Airflow}(1) & T_{Primary}(1) \\ \vdots & \vdots & \vdots & \vdots & \vdots \\ 1 & CPU(m) & T_{CPU}(m) & T_{Airflow}(m) & T_{Primary}(m) \end{bmatrix} \quad \text{(Equation 40)}$$

The initial estimates for the parameters $\theta_0$-$\theta_4$ can be determined from a normal Equation 41, $$\theta_0:4 = (J^T J)^{-1} J^T T_{Reference} \quad \text{(Equation 41)}$$

The other parameters of the model, i.e., $\theta_5$-$\theta_9$, are parameters that define the dynamics of each input signal. The parameters are used to create a LPF for each of the parameters. An initial value (e.g., a low pass frequency) of the parameters $\theta_5$-$\theta_9$ may be predetermined in some embodiments. All the parameters can then be fed through a nonlinear least squares (NLSQ) optimization method to find optimal values for all the parameters. In some embodiments, $\theta_5$-$\theta_9$ are bounded between zero and one to maintain model stability. The NLSQ method used to train the parameters can be Equations 42-49, $$\begin{aligned}
&\epsilon = 10^{-10} \\
&\text{for } i = 1 : iterationCount \\
&J_k = \frac{r(\theta_k + \epsilon) - r(\theta_k)}{\epsilon} \\
&p_k = (J^T J + \lambda I)^{-1} J^T r_k \\
&\text{if } (r_k(\theta_k) > r_k(\theta_k + p_k)) \\
&\theta_{k+1} = \theta_k + p_k \\
&\lambda_{k+1} = \lambda_k \cdot 0.1 \\
&\text{else} \\
&\lambda_{k+1} = \lambda_k \cdot 10
\end{aligned} \quad \text{(Equations 42-49)}$$

In the method defined by Equations 42-49, r may be a residual function or model error. The Jacobian J can represent the finite difference Jacobian of all the parameters. p can represent the step adjustment of the parameters. $\epsilon$ is a constant for the finite difference Jacobian. $\lambda$ is a damping parameter.

Parameter bounding can be performed by wrapping the desired parameters in a sigmoid function. The sigmoid function can be Equation 50, $$\theta_{bounded}(\theta) = \frac{ub - lb}{1 + e^{-\theta}} + lb \quad \text{(Equation 50)}$$

The symbols lb and ub are the lower bound and the upper bound for the sigmoid function. In some embodiments, lb is zero while ub is one. Using these boundings provided by the sigmoid function and the NLSQ method described above in Equations 42-49, optimal values can be determined for the parameters $\theta$. Further tweaking of the model can be performed to avoid undesired transients.

Figure 17:
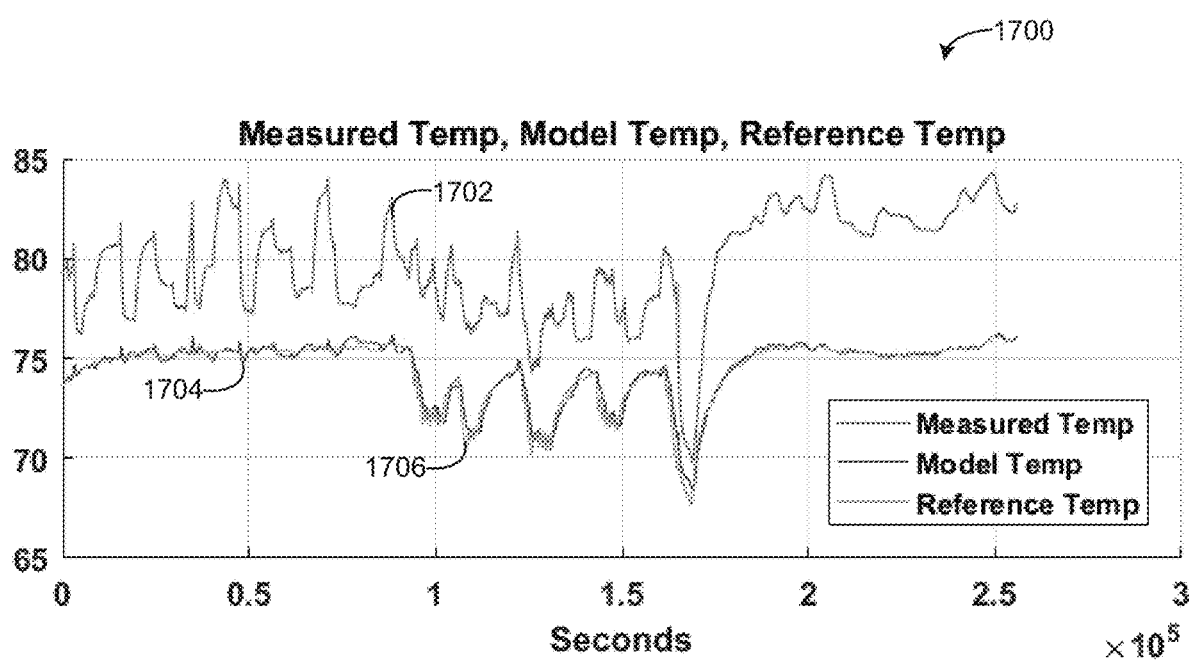
FIG. 17 is a chart illustrating the performance of the steady state temperature compensator, according to an exemplary embodiment.

Referring now to FIG. 17, a chart 1700 is shown illustrating the performance of the models (e.g., the model 1500 and the model 1600) trained and utilized by the steady state compensator 318, according to an exemplary embodiment. The data used to generate the data for the chart 1700 is experimental data collected in a room where airflow was varied in the room, room temperature was varied, and the CPU usage 1502 was varied. A model was trained against this data and was referenced against calibrated temperature sources for accuracy. The marker 1702 indicates the measured temperature, e.g., the temperature measured by the primary temperature sensor 352.

The model temperature indicated by the marker 1704 is the temperature determined by the steady state compensator 318 via one of the model. The reference temperature indicated by the marker 1706 indicates the actual temperature of the room. As can be seen, the temperature determined by the model closely matches the reference temperature. The model takes into account large transients in CPU temperature and airflow in a room with changing ambient temperature.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A thermostat for controlling building equipment of a building, the thermostat comprising:
   one or more temperature sensors configured to measure one or more temperature values;
   a processing circuit, coupled to the one or more temperature sensors, and configured to:
      receive the one or more temperature values from the one or more temperature sensors;
      receive one or more central processing unit (CPU) usage values, wherein the one or more CPU usage values indicate computing usage of the processing circuit; and
      determine, based on an empirical model using one or more gain values and filtering one or more signals, a temperature of the building, wherein the one or more signals comprise the one or more temperature values and the one or more CPU usage values, wherein the empirical model accounts for dynamics of heat generated by the processing circuit and airflow acting on the thermostat.

2. The thermostat of claim 1, wherein the empirical model is trained by determining one or more weights for the empirical model with collected training data and at least one or a combination of least squares, non-linear least squares, robust least squares, and robust nonlinear least squares.

3. The thermostat of claim 2, wherein determining one or more weights for the empirical model comprises:
   determining initial values for a first portion of the one or more weights with linear least squares with a second portion of the one or more weights respectively having predetermined initial value(s); and
   determining values for the one or more weights based on non-linear least squares, the collected training data for the one or more signals, initial values for the first portion of the one or more weights, and the predefined initial values of the second portion of the one or more weights.

4. The thermostat of claim 3, wherein the one or more weights are further determined with a sigmoid function, wherein the sigmoid function causes the one or more weights determined by the non-linear least squares to be within a range defined by a lower bound and an upper bound.

5. The thermostat of claim 1, wherein the processing circuit is configured to determine, based on the empirical model, room temperature by:
   multiplying a plurality of the one or more signals by the one or more gain values; and
   summing the plurality of the one or more signals multiplied by the one or more gain values to determine the room temperature.

6. The thermostat of claim 1, wherein the processing circuit is configured to determine, based on the empirical model, room temperature by:
   filtering each of a plurality of the one or more signals with at least one of one or more low pass filters (LPFs);
   multiplying the plurality of filtered signals by one of the one or more gain values; and
   summing the filtered signals multiplied by the one or more gain values to determine the room temperature of the building.

7. The thermostat of claim 6, wherein filtering each of the plurality of the one or more signals with the one or more LPFs comprises, for each signal of the one or more signals:
   multiplying one of one or more weights with a difference between a current value of the signal and a past value of the signal; and
   determining the filtered signal by adding the past value of the signal to the multiplication of the one of the one or more weights with the difference.

8. The thermostat of claim 6, wherein summing the one or more filtered signals multiplied by the one or more gain values to determine the room temperature comprises determining the room temperature by filtering the summation of the one or more filtered signals multiplied by the one or more gain values with one of the one or more LPFs.

9. The thermostat of claim 1, wherein the empirical model is a reduced parameter empirical model, wherein the processing circuit is configured to determine, based on the reduced parameter empirical model, room temperature by:
   filtering a first portion of a plurality of the one or more signals with one or more filters, wherein the one or more filters are one or more LPFs;
   filtering the filtered first portion of the plurality of the one or more signals a second time with the one or more filters;
   multiplying the first portion of the plurality of the one or more signals filtered the second time by one or more weight values;
   multiplying a second portion of the plurality of the one or more signals by the one or more weight values, wherein the second portion of the plurality of the one or more signals are not filtered by the one or more LPFs; and
   summing the first portion of filtered signals multiplied by the one or more weights and the second portion of the plurality of the one or more signals multiplied by the one or more gain values to determine the room temperature.

10. The thermostat of claim 1, wherein the one or more temperature values comprise a primary temperature value, a processing circuit temperature value, and an airflow temperature value.

11. The thermostat of claim 10, wherein the one or more temperature sensors comprise a primary temperature sensor, wherein the primary temperature sensor is positioned within the thermostat and is substantially isolated from heat generating components of the thermostat, wherein the primary temperature sensor is configured to measure the primary temperature value.

12. The thermostat of claim 10, wherein the one or more temperature sensors comprise a processing circuit temperature sensor positioned a predefined distance from the processing circuit, wherein the processing circuit temperature sensor is configured to measure the processing circuit temperature value, wherein the processing circuit temperature value accounts for heat generated by the processing circuit.

13. The thermostat of claim 10, wherein the one or more temperature sensors comprise an airflow temperature sensor, wherein the airflow temperature sensor is located a predefined distance from a component of the thermostat that generates a predefined amount of heat, wherein the airflow temperature sensor is configured to measure the airflow temperature value, wherein the airflow temperature value correlates to an amount of airflow acting on the thermostat, wherein the airflow temperature sensor and the component form a hot wire anemometer.

14. The thermostat of claim 13, wherein the component of the thermostat that generates the predefined amount of heat is a resistor.

15. A method for controlling building equipment of a building, the method comprising:
- receiving one or more temperature values measured by one or more temperature sensors;
- receiving one or more central processing unit (CPU) usage values, the one or more CPU usage values indicating computing usage of a processing circuit of a thermostat; and
- determining, based on an empirical model using one or more gain values and filtering one or more signals, a temperature of the building,
- wherein the one or more signals comprise the one or more temperature values and the one or more CPU usage values, and wherein the empirical model accounts for dynamics of heat generated by the processing circuit and airflow acting on the thermostat.

16. The method of claim 15, further comprising:
- training the empirical model by determining one or more weights for the empirical model with collected training data and at least one or a combination of least squares, non-linear least squares, robust least squares, and robust nonlinear least squares.

17. The method of claim 16, wherein determining one or more weights for the empirical model further comprises:
- determining initial values for a first portion of the one or more weights with linear least squares, wherein a second portion of the one or more weights have predetermined initial value; and
- determining values for the one or more weights based on non-linear least squares, the collected training data for the one or more signals, the initial values for the first portion of the one or more weights, and the predefined initial values of the second portion of the one or more weights.

18. The method of claim 15, wherein one or more filters comprise one or more low pass filters (LPFs), the method further comprising:
- filtering each of a plurality of the one or more signals with at least one of the one or more LPFs;
- multiplying the plurality of filtered signals by one of the one or more gain values; and
- summing the one or more filtered signals multiplied by the one or more gain values to determine room temperature of the building.

19. The method of claim 18, wherein filtering each of the plurality of the one or more signals with at least one of the one or more LPFs further comprises:
- multiplying one of the one or more weights with a difference of a current value for a signal of the one or more signals and a past value of the signal; and
- determining the filtered signal by adding the past value of the signal to the multiplication of the one of the one or more weights with the difference.

20. The method of claim 18, wherein summing the one or more filtered signals multiplied by the one or more gain values to determine the room temperature further comprises:
- determining the room temperature by filtering the summation of the one or more filtered signals multiplied by the one or more gain values with one of the one or more LPFs.

* * * * *